United States Patent
Heldeis

(10) Patent No.: US 11,928,069 B2
(45) Date of Patent: Mar. 12, 2024

(54) OPTICAL OUTPUT DEVICE, BUS UNIT, BUS CONTROL UNIT AND METHODS

(71) Applicant: Christoph Heldeis, Munich (DE)

(72) Inventor: Christoph Heldeis, Munich (DE)

(*) Notice: Subject to any disclaimer, the term of this patent is extended or adjusted under 35 U.S.C. 154(b) by 0 days.

(21) Appl. No.: 17/422,666

(22) PCT Filed: Jan. 15, 2019

(86) PCT No.: PCT/EP2019/050935
§ 371 (c)(1),
(2) Date: Jul. 13, 2021

(87) PCT Pub. No.: WO2020/147930
PCT Pub. Date: Jul. 23, 2020

(65) Prior Publication Data
US 2022/0121606 A1    Apr. 21, 2022

(51) Int. Cl.
*G06F 13/20* (2006.01)
*G06F 13/40* (2006.01)
*G06F 13/42* (2006.01)

(52) U.S. Cl.
CPC ...... *G06F 13/4221* (2013.01); *G06F 13/4022* (2013.01)

(58) Field of Classification Search
CPC ............. G06F 13/4221; G06F 13/4022; G06F 13/4295; G06F 13/4291
See application file for complete search history.

(56) References Cited

U.S. PATENT DOCUMENTS

| | | | |
|---|---|---|---|
| 5,526,490 A | 6/1996 | Nishikawa | |
| 6,405,280 B1 | 6/2002 | Ryan | |
| 8,492,983 B1* | 7/2013 | Berg | H05B 47/18 315/307 |
| 10,055,276 B2 | 8/2018 | Newkirk | |
| 2005/0109940 A1* | 5/2005 | Carr | G01J 5/20 250/338.4 |
| 2007/0208967 A1 | 9/2007 | Pedersen | |

(Continued)

FOREIGN PATENT DOCUMENTS

WO    2014/131699 A2    9/2014

OTHER PUBLICATIONS

International Search Report (two pages) dated Oct. 9, 2019 from corresponding PCT Application No. PCT/EP2019/050935.

(Continued)

*Primary Examiner* — Henry Tsai
*Assistant Examiner* — Kim T Huynh
(74) *Attorney, Agent, or Firm* — Crowell & Moring LLP

(57) ABSTRACT

An optical output device is described that includes one bus system. The bus system includes two bus wires of a bus, two bus units and one bus control unit. The two bus units may include one optical output element one output control unit whose output is connected to the one optical output element a first storage unit for storing address data of the respective bus unit a second storage unit for storing a counter value, a comparison unit whose inputs are connected to the first storage unit and to the second storage unit, and a control unit whose input is connected to an output of the comparison unit and which controls the takeover of data from the bus into the output control unit depending on an output signal or on output data of the comparison unit.

14 Claims, 12 Drawing Sheets

(56) References Cited

U.S. PATENT DOCUMENTS

| | | | |
|---|---|---|---|
| 2009/0187779 A1* | 7/2009 | Liu | G06F 1/3221 |
| | | | 713/323 |
| 2017/0083467 A1* | 3/2017 | Mishra | G06F 13/4282 |
| 2018/0267916 A1 | 9/2018 | Mishra et al. | |
| 2018/0302165 A1* | 10/2018 | Truong | G02B 6/30 |
| 2018/0324609 A1* | 11/2018 | Diancin | H04L 47/83 |
| 2022/0121606 A1* | 4/2022 | Heldeis | G06F 13/4221 |

OTHER PUBLICATIONS

Written Opinion (seven pages) dated Oct. 9, 2019 from corresponding PCT Application No. PCT/EP2019/050935.
U.S. Appl. No. 17/422,681, filed Jul. 13, 2021.
U.S. Appl. No. 17/422,701, filed Jul. 13, 2021.
U.S. Appl. No. 17/422,804, filed Jul. 14, 2021.
European Communication dated Apr. 18, 2023 in corresponding European Patent Application No. 19701171.1.

\* cited by examiner

OPTICAL OUTPUT DEVICE, BUS UNIT, BUS CONTROL UNIT AND METHODS

This application is a national application based on Patent Cooperation Treaty Patent Application No. PCT/EP2019/050935, filed on Jan. 15, 2019, the entire contents of which are incorporated herein by reference.

FIELD OF INVENTION

The present invention generally relates to an optical output device, including at least one bus system which comprises at least two bus wires or lines of a bus, at least two bus units and at least one bus control unit. The bus units control optical output elements, for instance LEDs. Thus, the invention relates more specifically to LED stripes. Furthermore, the invention relates to corresponding units and to corresponding methods.

BACKGROUND OF INVENTION

LED strings including a serial connection of LEDs may be used for instance in order to lighten the keys of a keyboard, see for instance WO 2014/131699, second aspect. However, if one LED of a string or of a serial connection is out of order all other LEDs of the same string cannot be controlled any more. In this implementation all LEDs have the same brightness and the same color.

More sophisticated electronic circuits have to be used if the LEDs or other light sources have to be controlled independently from each other. It is for instance possible to connect each LED to a separate output of a microcontroller and to have a "running" light by giving out a signal to the output nodes of the microcontroller in the same sequence in which the LEDs are arranged on a line or on a curved path.

SUMMARY OF THE INVENTION

An optical output device, including:
  at least one bus system which includes at least two bus wires of a bus, at least 10, at least 100 or at least 1000 bus units and at least one bus control unit,
  wherein at least two bus units or all bus units comprise (list A):
    at least one optical output element,
    at least one output control unit whose output is connected to the at least one optical output element,
    a first storage unit for storing address data of the respective bus unit,
    a second storage unit for storing a counter value,
    a comparison unit whose inputs are connected to the first storage unit and to the second storage unit, and
    a control unit whose input is connected with an output of the comparison unit and which controls the takeover of data from the bus into the output control unit depending on an output signal or on output data of the comparison unit.

Furthermore, there are corresponding units given, i.e. a bus unit and a bus control unit as well as corresponding methods according to the independent device claims and the independent method claims.

DESCRIPTION OF GENERAL EMBODIMENTS

It is an object of the invention to give an optical output device that allows independent control of optical output elements, especially a simple device. The device should preferably be able to control the optical output elements in a very fast way in order to enable, for instance, a broad range of high speed applications. The device should preferably be robust in that sense that it does not matter for the overall function of other optical elements if one optical element does not work properly. Furthermore, a corresponding bus unit, bus control unit as well as corresponding methods have to given.

One or more of these problems are solved by the devices units and the methods described herein.

The optical output device may include at least one bus system which includes at least two bus wires of a bus, at least two, at least 10, at least 100 or at least 1000 bus units and at least one bus control unit. There may be less than 10 000 bus units on one bus. The at least two bus units or all bus units may include (list A):
  at least one optical output element,
  at least one output control unit whose output is connected to the at least one optical output element,
  a first storage unit for storing address data of the respective bus unit,
  a second storage unit for storing a counter value, preferably a current counter value,
  a comparison unit whose inputs are connected to the first storage unit and to the second storage unit,
  and a control unit whose input is connected to an output of the comparison unit and which controls the takeover of data from the bus into the output control unit depending on an output signal or on output data of the comparison unit.

A bus system in which the bus units are connected in electrically parallel connection to the bus wires is very robust with regard to a failure of a bus unit or to a failure of an optical output element. The usage of simple registers, counter values and of simple comparison units allow a hardware solution that is very fast and that does not need slow sequential software components. The comparison unit and the usage of counter values in each bus unit allow an implicit addressing that does not need separate address lines and slow signaling of address signals on such address lines. The transmission speed of data to the optical output elements may be increased further if data is written in larger blocks or bulks to consecutive bus units. There are many application scenarios that take advantage of such bulk writes, for instance display devices that display movies, advertising or other visual information. Other applications may be in the field of light effects for advertising, discotheques, design etc.

The counter value may be counted up or down in all bus units in the same way. Each bus unit may compare the counter value with its own address and knows by comparison when it is its turn for access to data.

It is possible to use four bus wires, i.e. two wires for data transmission and two wires for supply voltage of the bus units. Alternatively, two bus wires may be used by transmitting data via the power lines. It is possible that one bus wire or line is realized by ground, i.e. earth potential.

The first storage units may contain volatile storing cells or non-volatile storing cells. If volatile storing cells are used the addresses may be determined with different methods mentioned below always in the same way and in the same sequence in which the bus units are arranged on the bus wires. If non-volatile storing units are used it is possible to program the addresses electronically in advance, for instance using ROM (Read Only Memory), PROM (Programmable ROM), EPROM (Electrically PROM), or EEPROM (Erasable EPROM), or mechanically by switching DIP (Dual In Line Package) switches either manually or automatically.

The optical range is mainly the visible range of light, i.e. the range from 380 nm (Nanometer) to 780 nm, i.e. from violet to red. However, the adjacent ranges may also be regarded as optical ranges for the application of the invention, i.e. the ultra violet UV range (100 nm to 380 nm) and infrared IR range (780 nm to 1 mm (Millimeter)) wavelength of electromagnetic radiation.

All units of the bus system may be produced completely in hardware, i.e. without using microprocessors and sequential programs. This allows the cost effective production of thousands of bus units comprising cheap optical output elements as well as the electronic driver circuits for controlling or driving the optical output elements, for instance LEDs. Pulse width modulation may be used for instance. One possibility is the use of ASICs (Application Specific Integrated Circuit) or FPGA (Field Programmable Gate Array) having programmable interconnections between standard circuit blocks. Integrated circuits without programmed interconnection may be used if the demand is high enough.

The address data may be an identifier that identifies the respective bus unit with regard to the other bus units on the same bus wires in an unambiguous and unique way. There may be an optional separate counter unit for incrementing or decrementing the counter value. Alternatively the counter unit may be part of the control unit.

The bus units may comprise a counter unit that changes the counter value and/or a 8b/10b decoding unit. The encoding of 8 bit of data into a symbol of 10 bit allows to add redundancy for error detection and error correction if used. 8b/10b coding and decoding is appropriate for differential signal transmission. Therefore the bus control unit may comprise a driver unit which sends data according to a differential signal (or data) transmitting method. On the other side, the bus units may comprise respectively a receiver unit which receives data according to a differential signal (or data) transmitting method. Differential signaling is very robust with regard to EMI (ElectroMagnetic Interference). Thus bus systems with hundreds or thousands of bus units are possible as well as long bus systems, for instance longer than 5 meters, longer than 50 meters or longer than 100 meters and/or bus systems with very high transmission speed, for instance higher than 1 Mbit/s (Megabit per second) or higher than 10 Mbit/s or even higher. On the receiver side, the potential value at one input of the receiver is subtracted from the potential value on the other input of the receiver in differential signal transmission with the logical information being carried for instance by the sign of the result.

As mentioned above the optical output device may preferably not comprise separate address lines between the bus control unit and the bus units and neither an address bus that is multiplexed with a data bus.

All bus units may have the same optical output element(s) or there may be bus units that have different or no output elements. The bus units with no output elements may have input elements or may be used for other purposes.

The bus control unit may operate according to a bus protocol according to which data for bus units with consecutive addresses or identifiers may be sent or is sent in ascending or descending order without the transmission of intermediate address data. This may be done by using implicit addressing that will be explained in detail below. The general principle is that the order of the data that is sent is the same as the order of the addresses of the bus units that shall receive the respective data. For example the first data word or data group is for the first bus unit, the second data group for the second bus unit and so on. However, the first data word or data group may be for the fifth bus unit, the second data group for the sixth bus unit and so on. This principle is very simple and easy to implement if there are also solutions for the allocation of addresses to the bus units, especially to hundreds or thousands of bus units in an effective way. The inventors of this invention have found several solutions for the allocation of addresses, i.e. programming during assembling or allocation of addresses at the time of power on. The second method may be implemented in a very efficient way by using the simple addressing scheme of the proposed bus system and by using further electronic components. Some of these methods will be described below. If these methods are known it is, of course, possible to find similar methods as well.

The optical output device may comprise a serial connection of at least two or of at least 10 electronic components, especially of resistors or capacitors or of resistors and capacitors. At least one input of each bus unit may be connected to a respective electrically conductive connection between two components of the serial connection forming a tap or taps thereby. The inputs of the bus units may be connected to an input of a determining unit, especially for determining the potential, preferably to the input of an analogue digital converter unit or to the input of a Schmitt Trigger unit. Other detection devices may be used as well, i.e. other devices for the detection of potentials or devices that detect current which may be a bit more complex compared to the detection of potentials. The usage of a chain of electronic components that extends along the bus wires gives room for plenty of physical possibilities to detect the spatial order of the bus units on the bus in an unambiguous and unique way. Each bus unit may receive the same address each time the address allocation is performed.

However, if the bus system is changed in the meantime there may be other results. It may be possible to add or remove bus units. Furthermore the bus system may be made longer or shorter. All these changes may be automatically considered within the next allocation of addresses. It has to be mentioned that the proposed allocation scheme automatically adapts to different numbers of bus units on the bus system. This means that no changes may have to be made with regard to the allocation method, preferably a hardware method, depending on customer demands, versions or subversions of the bus system.

During address allocation, special care may be taken to consider tolerances of the detection devices as well as the influences of interferences, for instance from EMI or instable power supplies. Compared to the speeds of data transmission on the bus system there may be much more time for address allocation using the chain of electronic components.

The first storage units may be cheap volatile storing units, for instance RAM (Random Access Memory), shift-register etc., if address allocation on power on is used. At least one end or both ends of the serial connection may be connected to the bus control unit or to a further control unit.

Further topologies for the bus system and for connections to the chain of components, for instance resistors, are possible as well. Some of these topologies are mentioned below. It may be a good idea to perform the address allocation for several sections of the bus system separately from other sections. However, results from adjacent sections may be used to correct detection errors. All taps of the chain may be connected to detection pins or nodes of the bus units. Alternatively, not all taps of the chain have to be connected to bus units. There may also be direct connections from taps of the chain to the bus control unit or to the other control unit that controls address allocation. Furthermore, adapted bus units may be connected to the ends of adjacent segments of the chain, especially if the bus is longer. It is also possible to use special bridge control units that are connected to adjacent ends of bus segments as well as to respective adjacent segments of the chain of electronic components used for address allocation. This may allow even longer bus systems. Even a "tree" of busses is possible with MIC-like units on the master bus branching off other busses.

All components of the chain, i.e. of the serial connection, may have the same value, especially in the range of a given tolerance. However, there may also be schemes that use components having different values with regard to the other electronic components, for instance components with increasing or with decreasing values.

The chain of electronic components may be produced in an easy way together with the bus lines or bus wires because the chain extends along the bus wires. If a printed circuit board (PCB) technique is used for a carrier that carries the bus system, e.g. using FR-4 material (Flame Retardant) or another PCB material, for instance a flexible PCB material, it is possible to use carbon printing or SMD (Surface Mounted Device) techniques, especially for resistors.

An ADC may be used if it is also used for other purposes within the bus units. A Schmitt-Trigger-circuit is a detection unit that is simpler compared to an ADC, however the detection resolution is not as good as in an ADC. The lower detection resolution may be tolerable if there is enough time to perform more sophisticated allocation schemes compared to the allocation schemes that uses an ADC.

Alternatively, the first storage units may be non-volatile storing units, for instance using ROM, EPROM or EEPROM. The addresses of the bus units may be programmed for longer times, for example for more than one year, into the first storage units. Using non-volatile storing units allows that no address allocation has to be implemented within the optical output device. Furthermore, the addresses are allocated already immediately after power on of the device allowing very short power on times.

Programming of the storing units may be performed during or at the end of the production of the chips of the bus units. Care has to be taken that the order of the chips is maintained until assembling to the bus system. Appropriate tapes or carriers on reels may be used for this purpose, for instance self-adhesive tapes or carriers. Alternatively it is possible to directly allocate the addresses after first power up like with volatile storage and write the addresses then to some permanent storage.

Programming of the storing units may also be performed during the assembling of the bus system, i.e. during the connection of the bus units to the bus lines or bus wires. The order of the bus units and therefore also the order of the addresses has to be maintained and is known during assembling.

The bus wires may extend along a straight line, preferably along the isle of an airplane/air craft, vehicle or ship, on the frontage of a building or within a building, on a piece of garment, on a piece of furniture, on a wallpaper, on a lamp or on or within a vehicle, plane or ship. Alternatively, the bus wires may extend along a path that changes direction at least once or at least three times, preferably on a Christmas tree, on the frontage of a building or within a building, on a piece of garment, on a piece of furniture, on a wall paper, on a lamp or on or within a vehicle, plane or ship. In both cases adjacent bus units and preferably adjacent optical output elements may be arranged according to a constant grid pattern. The distance of the grid elements may depend on the application. However, there may be applications that prefer different distances between adjacent bus units/output elements.

In the one dimensional case or the case in which the bus units are not located within a plane or within several planes the bus units/optical output elements may be fastened on:
  garment/clothing, e.g. pair of trousers, coat, dress, skirt, shirt, blouse, shoe—especially within the sole, etc., or
  a piece of furniture, e.g. shelf, cupboard, wall system, kitchenette, bed etc., or
  on other surfaces that are appropriate.

Alternatively the bus wires may extend within a plane and preferably change direction at least once or at least three times within the plane, preferably according to a meandering course. Between the parts of the bus that change direction sections of several bus units may be arranged in whose sections the bus wires extend preferably along a respective straight line. The straight lines may be parallel with regard to each other. This arrangement may be useful for the following applications: a display for watching films, a display for showing information, a keyboard or other input arrangement, on the frontage of a building or within a building, on a piece of garment (see preceding paragraph), on a piece of furniture (see preceding paragraph), on a wallpaper, on a lamp or on or within a vehicle, plane or ship.

Also for these two dimensional cases adjacent bus units and preferably adjacent optical output elements may be arranged according to a constant grid pattern preferably a two dimensional grid pattern. This is appropriate for displays. It seems feasible to use the proposed bus system for displays having at least thousand or at least ten thousand or at least one hundred thousand bus units, for instance on a glass substrate. Nevertheless, the data that has to be displayed may be changed within milliseconds. High resolution displays may use the proposed bus systems, for instance a 4K display, especially when several serial bus arrangements are used in parallel. Cheaper low end displays with less bus units may be sufficient for other display applications, for instance for monitoring a production, for displaying results in a sports stadium, displaying departures and arrivals of planes/trains etc., or for displays that are used for simple advertising purposes.

Alternatively, there may be no sections of several bus units in which the bus wires extend preferably along a respective straight line between the parts of the bus that change direction. This depends again on the application. It is for instance possible to have a bus system in spiral form, circle form etc.

According to a third alternative, the bus wires may extend within several planes that are arranged in parallel with regard to each other, i.e. a three dimensional (3D) case. Again, the bus wires may change direction at least once or at least three times within each of the planes, preferably according to a meandering course. Between the parts of the bus that change direction there may be sections of several bus units in which the bus wires extend preferably along a respective straight line. The straight lines may be parallel with regard to each other. Adjacent bus units and preferably adjacent optical output elements may be arranged according to a constant grid pattern preferably according to a three dimensional grid pattern. The carrier for the bus units/optical output elements may have the form of a 3D grid as well, for instance made of a metal, plastic or glass material. The carrier and/or the bus wires/lines may be transparent for the radiation from the output element. Flexible bus wires may be used. An alternative embodiment uses several glass substrates that are arranged in a stack of glass substrates. Each glass substrate may comprise for instance several thousands of picture elements. And there may be for instance more than 10 or more than 50 or even more glass substrates within one stack. There may be gaps between the glass substrates that do not comprise solid material. Alternatively, the glass substrates may be arranged close together within the stack, i.e. without gaps that comprise a gas or air.

This 3D display may be used for the presentation and/or visualization of spatial relations, of mathematical relations, of scientific or engineering tasks, of financial relations, of medical problems and so on. It is for instance possible to visualize the positions of two or more planes, straight lines, curves etc. So it is easy to see where intersections between these elements are located. Alternatively, the 3D display may be used for advertising purposes, for design or for fun, e.g. showing light effects, "running" light points, light planes or light spheres and other curved light "surfaces".

However, other three dimensional arrangements of the bus units/output elements may be used as well, i.e. without arrangement on a 3D grid.

The optical output device may comprise at least two, at least 10 or at least 100 bus systems that comprise each at least two bus wires, bus units and bus control units. There may be less than 10 000 bus systems. A super ordinated control unit may control the bus control units (MIC) of the different bus systems. The bus systems may extend in parallel to each other and may be arranged in one plane or in several planes that are parallel with regard to each other. Thus it is possible to make the control of 2D or 3D displays much easier, i.e. the mapping between pixel (picture element) data in a computer and data within the 2D or 3D display. The mapping of data may be more complicated for a meandering bus system.

Furthermore, the speed of a change of the output of the optical output elements may be higher if more bus systems are used. This is most relevant for 3D displays because there is a cubic dependency of total output elements from the amount of output elements along one edge of the cube display, for instance 100×100×100=1 000 000 (1 million).

The optical output elements may comprise simple anorganic light emitting diodes (LED) or simple and cheap organic light emitting diodes (OLED) or halogen lamps or light bulbs. Each bus unit may comprise exactly three optical output elements, especially optical output elements having output wavelength that are different with regard to each other, especially with wavelengths within the red wavelength range, within the green range and within the blue range or with regard to three other basic colors that are appropriate for color mixing according to addition or subtraction of colors. The mixing of colors results in the perception of other colors within the human eye, e.g. yellow or orange.

Colored optical elements, especially for three basic colors that are mixed, may be relevant for the 1D case as well as for 2D and 3D displays mentioned above. Thus it is possible to have monochrome or full color displays.

The bus units may be connected to at least one input element, especially to a switch or push-button, or to a sensor element, especially to a photo diode, photo transistor, photo resistor, pyro electric sensor or to a temperature sensor. All bus units may have the same input element(s) or there may be bus units that have different or no input elements. There may also be bus units that have more than one input element.

Using the input elements it is possible to react to changes in the environment, i.e. to control the output elements depending on these changes. There may be a response to shadow effects of persons, vehicles, planes, clouds etc. Alternatively, the output elements may "react" to changes of external lights and/or to a change in external temperature. Read access may be used within the bus protocol in order to read registers that include data from the input elements.

Again the proposed bus system is best fitted for block or bulk read access, i.e. only one starting address is transmitted and then very fast reading data from consecutive bus units is possible without intermediate transmission of further address data. It is also possible to transmit an end address for reading or writing or to transmit a number that corresponds to the number of bus unites involved in the following block read or block write. It is furthermore possible to define a number of involved bus units in advance. This number may be used if there was no special signaling with regard to the end of block read or block write in advance.

An input arrangement, especially a keyboard may be a useful application of a bus system in which each bus unit comprises the same optical output element(s) and the same input element, i.e. a key switch, each key switch carrying a different pattern. It is possible to control the light for each key independently from the light for other keys or key switches. Thus the user may select different colors for different keys or for different groups of keys, for instance for the number key block. The key switches may be analogue input elements, for instance by coupling with a potentiometer, or digital switches.

The optical output device may comprise a carrier device that carries the bus wires and the bus units. The carrier device may preferably comprise in at least 90 percent of volume a printed circuit board material (PCB), especially FR-4, and/or a flexible (PCB) material, or a plastic material (ABS, PP) or a metal or a ceramic material. The carrier device may be at least 1 meter, at least 5 meters, at least 10 meters or at least 50 meters long. The length may be less than 500 meters. The carrier device may comprise a material that is transparent for the optical radiation of the output element. Alternatively, the optical output elements and/or the bus units may be mounted on the bus wires without using an additional carrier device. Such self-supporting devices may be appropriate for light chains or light stripes for buildings, Christmas trees etc.

The invention also relates to a bus unit, especially to a bus unit of an optical output device according to one of the embodiments described above. Therefore the bus unit may comprise the parts that have been listed in list A above. The bus unit may be implemented within an ASIC or depending on the demand also within an integrated circuit IC. The bus unit may comprise a state machine that has different internal states, i.e. switching states. The states are changed depending on input values for instance. Several states may result in a change of output values. This means that there is no processor that processes commands of a software program. However, alternatively it is also possible to use bus units not having state machines but processors, for instance microprocessors. Counter units, comparison units and state machines may be implemented in hardware using modules that are available within the market, for instance software tools and libraries/collections of circuit models. The technical effects that are valid for the optical output device are also valid for the bus unit and its embodiments.

The invention relates further to a bus control unit, especially to a bus control unit of an optical output device according to one of the embodiments described above. The bus control unit may comprise a control unit which operates according to a bus protocol according to which data for bus units with consecutive addresses or identifiers may be sent or is sent in ascending or descending order without the transmission of intermediate address data. The bus unit may be implemented within an ASIC, i.e. without using software. Alternatively software may be used. The technical effects that are valid for the optical output device are also valid for the bus control unit and its embodiments.

Furthermore, a method for operating an optical output device is given, preferably for operating an optical output device according to one of the embodiments described above. The method includes:

using at least two bus wires/lines of a bus, connecting a plurality of bus units in parallel connection to the bus wires, using at least one bus control unit that writes data to the bus units in order to control output elements that are electrically connected to the bus units, allocating of internal addresses or identifiers to bus units, at least during block write operations reading data in all bus units or at least two bus units on the bus wires, at least during block write operations counting an internal counter in all bus units or in at least two bus units up or down, at least during block write operations comparing the internal address or identifier and the value of the internal counter in all bus units or in at least two bus units, and at least during block write operations writing data for controlling the output elements into at least one register of an output control unit of the respective bus unit depending on the result of the comparison.

The same technical effects mentioned above also apply for the method for operating an optical output device and its embodiments. The order of these steps may be varied as long as all steps are performed.

There may be very fast bulk read and/or bulk write accesses for at least 20 percent, at least 50 percent or at least 75 percent of the bus units or for all bus units. The addresses of the bus units may be programmed into non-volatile memory cells. Alternatively flexible allocation schemes may be used, especially by using a chain of electronic components.

Last but not least a method for assembling an optical output device is proposed, preferably for assembling an optical output device according to one of the embodiments described above. The method includes:

using at least two bus wires of a bus, connecting a plurality of bus units in parallel connection to the bus wires, connecting to the bus wires at least one bus control unit that sends data to the bus units in order to control optical output elements that are electrically connected to the bus units.

The same technical effects mentioned above also apply for the method for assembling and its embodiments. The order of these steps may be varied as long as all steps are performed.

The foregoing has outlined rather broadly the features and technical advantages of embodiments of the present invention in order to understand the detailed description of the invention that follows better. Additional features and advantages of embodiments of the invention will be described hereinafter whose embodiments also form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to implement and use the invention, and do not limit the scope of the invention. Moreover, the same reference signs refer to the same technical features if not stated otherwise. As far as "may" is used in this application it means the possibility of doing so as well as the actual technical implementation. As far as "about" is used in this application, it means that also the exact given value is disclosed. The Figures are not drawn to scale, i.e. there may be other dimensions and proportions of the shown elements.

The present invention will be described with respect to the preferred embodiment in a specific context namely an optical output device in the form of an output device with LEDs as output elements. The invention may also be applied, however, to other output arrangements.

Figure 1:
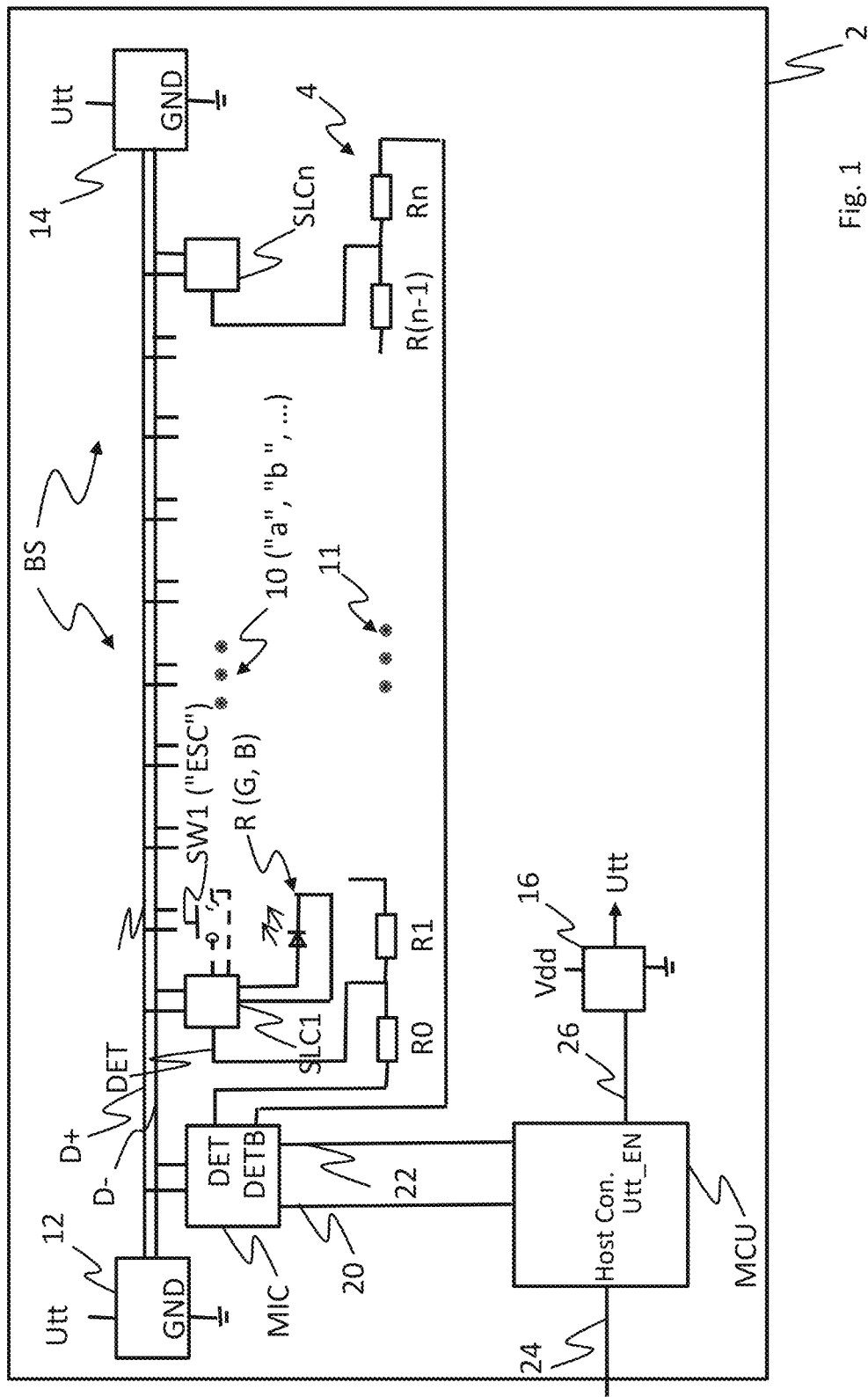
FIG. 1 illustrates a bus topology of a bus system.

FIG. 1 shows a first bus topology of a bus system BS. In the first bus topology there is one bus control unit MIC that is connected with a chain 4 of resistors R0 to Rn all having the same resistive value within the fabrication tolerance. This means that the MIC is able to perform an address allocation method in order to allocate addresses to the SLC after power on.

However there may be a second bus topology where an MCU is connected to chain 4 of resistors R0 to Rn. In this case the MCU controls the allocation of addresses to SLCs. It is possible to have a further tap that goes from the middle of chain 4 to a further input/output pin of the MCU when using the second topology.

A third topology uses one master MIC and several subordinated MICs on bus system BS. This may allow longer bus wires or more SLCs on bus DHIB. The subordinated MICs are also part of chain 4, i.e. their pins DET and DETB are connected to the left or right with resistors.

A fourth topology uses a master MIC and several bridge MICs that are placed between adjacent bus segments of bus system BS and between segments of chain 4. In this topology, line termination units are located at the ends of the wires of the bus of each bus segment. It is possible to have even longer bus systems using bridge MICs.

It is, of course, possible to combine features of the four topologies to get further topologies.

The first bus topology is described in more detail here. The bus system BS is part of an output device 2 that comprises more than 100 LEDs R or G or B or LED groups R, G, B, one of them shown on bus unit SLC1. Optionally one switch may be connected to each SLC, see switch SW1 on SLC1 which is for instance the "ESC" (Escape) key, i.e. the output device is also a keyboard according to this option. Although the bus DHIB (Differential Host Interface Bus) of bus system BS is shown along a straight line in FIG. 1 the bus DHIB may change its direction several times in another output device 2 so that there are several parallel sections of bus DHIB, for instance 5 to 7 parallel sections, see FIGS. 6 and 7.

The resistors R0 bis Rn of chain 4 of resistors are connected in a serial connection beginning with R0, then R1 and so on, see further resistors 11, to the last but not least resistor R(n−1) and to the last resistor Rn. The free end of resistor R0 is connected to a DET output of bus control unit MIC. The free end of resistor Rn is connected to a DETB output of bus control unit MIC. Between two adjacent resistors there are respective taps. The tap between R0 and R1 is connected to bus unit SLC1 input/output pin DET (DETermine). The tap between R1 and R2 is connected to a bus unit SLC2 (not shown, see further bus units 10) and so on. The final tap between resistor R(n−1) and Rn is connected to the last bus unit SLCn on the bus DHIB. The ends of chain 4 may be connected to pins DET, DETB on a bus control unit MIC or on the MCU.

LED groups of three LEDs red R, green G and blue B may be coupled to each bus unit SLC respectively. It is possible to control the LED groups and the LED within one group independently from the LEDs of other groups or of other LEDs within the same group.

The bus system BS includes:
one bus control unit MIC (MIC—Master Interface Controller) in short MIC,
bus units SLC1 to SLCn (SLC subordinated or slave controller) in short SLC, for instance between 100 and 200 SLCs or 250 SLCs, and
the bus DHIB (Differential Host Interface Bus) in short DHIB.

The bus DHIB comprises two bus wires D+, D−. Bus wire D+ is for the transmission of the logical positive signals, i.e. it signals a logical 1 with positive potential. Bus wire D− is for the transmission of the negative (logically inverse) signals of the differential signal. The bus units SLC1, 10 to SLCn are conductively connected to the bus wires D+ and D− in parallel connection. This means that all other bus units SLC will still work even if one bus unit SLC does not work properly or does not work at all.

Furthermore, output device 2 comprises a processor unit MCU (Microprocessor Control Unit) or in short MCU. Between the MCU and the bus control unit MIC there is an SPI (Serial Peripheral Interface) bus 20, see FIG. 4 for more details. Furthermore, there are control lines 22 between the MCU and the bus control unit MIC. Control lines 22 are also explained in more detail with regard to FIG. 4 below. There is an interface 24, for instance USB (Universal Serial Bus), Bluetooth etc., between the MCU and a further MCU or/and a main processor of a computer. Interface 24 is used to transmit data that sets output states of output elements of output device 2 from the main processing unit. Optionally, input data from input elements on bus units SLC may be read and sent to the main processor.

There are two bus termination units 12, 14 at the ends of bus DHIB for line termination, i.e. in order to prevent reflection of signals at the end of the wires D+ and D−. Such reflection would interfere with the transmitted signals. A power unit 16 generates the power, i.e. the power potential Utt, for bus termination units 12, 16. The relevant voltage is derived from ground GND potential and positive potential Vdd. There is an enable line 26 from MCU to power unit 16 that enables or disenables power generation for potential Utt, i.e. for the potential that is relevant for the powering of the line termination units 12 and 14. This may be used for energy saving. Biasing termination may use two potentials. While usually the negative one is GND and the positive is Utt there may be applications were it is necessary to move the potentials either further apart (for instance for a very large DHIB) or closer together (for instance for low power tweaking), which both will result in two distinct termination voltages Utt+ and Utt−.

Figure 2:
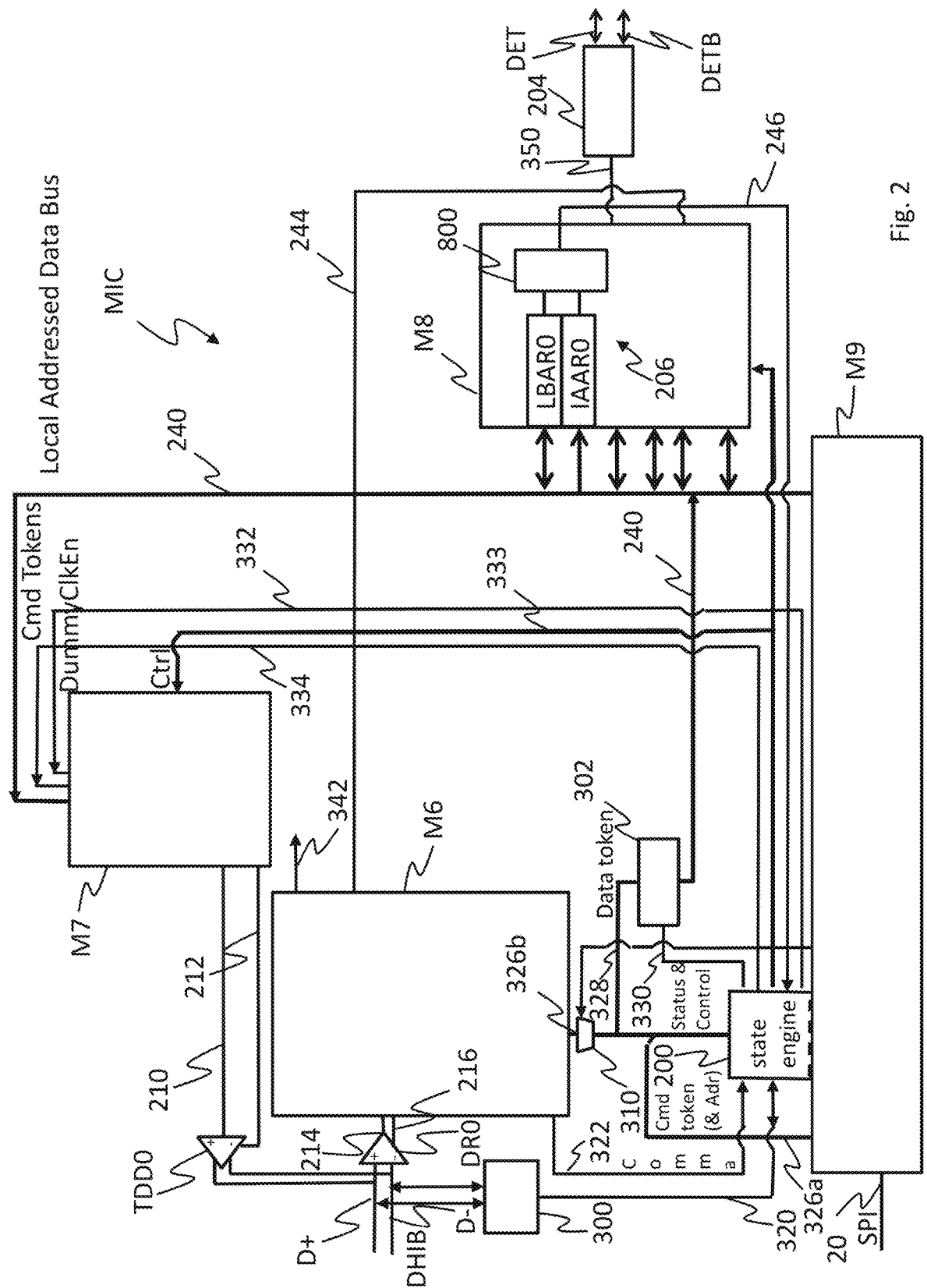
FIG. 2 illustrates sub units of a bus control unit (MIC)
Figure 4:
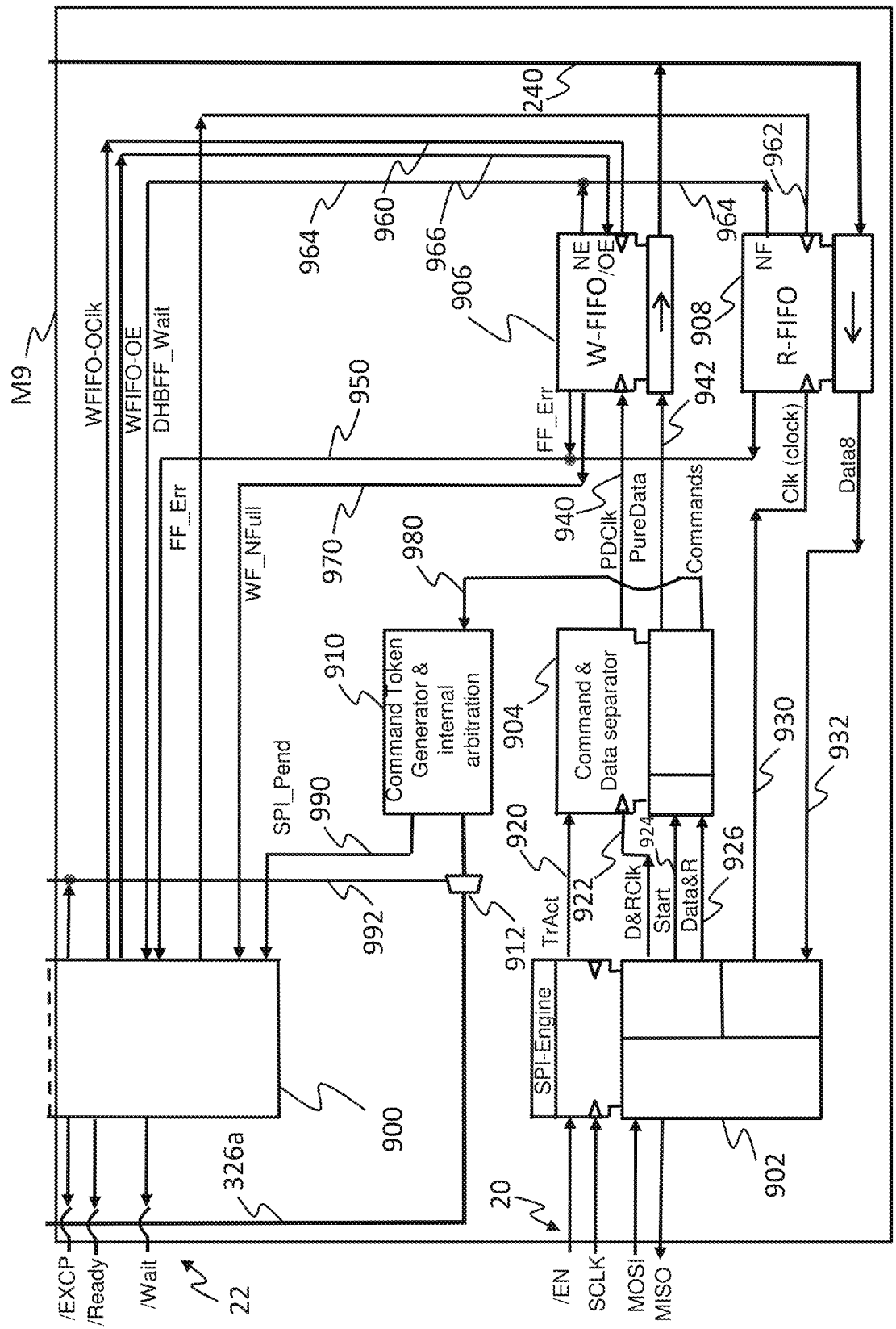
FIG. 4 illustrates sub units of an interface unit within the bus control unit (MIC)

FIG. 2 shows sub units of the bus control unit (MIC):
  a state engine 200 of bus control unit MIC that controls the functions of the MIC,
  a receiving unit M6 for receiving data and commands from bus DHIB,
  a transmitting unit M7 for sending data and commands to the bus DHIB,
  a match and general control unit M8 that is used for implicit addressing and for general control,
  an interface unit M9 that comprises an interface to and from the processor unit MCU, see FIG. 4 for more details,
  a tristate differential driver TDD0 with special state driving (OOB out of band) signaling. The two outputs of TDD0 are connected to bus wires D+ and D−.
  a differential receiver DR0 with special state detect. The two inputs of TDD0 are connected to bus wires D+ and D−.
  a DET control unit 204 having a first output pin DET that is connected to R0 of chain 4 and a second output pin DETB that is connected to the last resistor Rn of chain 4 enabling the MIC to set the ends of chain 4 to low and high during allocation of addresses to SLCs as described in more detail at the end of the description.
  an address and match unit 206 that is used for addressing and that comprises an address register LBAR0 (Local Bus Address Register, address register relevant for bus DHIB) and a counter register IAAR0 (Immanent (upcoming) Address Access Register) as well as a match/compare unit 800. Implicit addressing may be used for the LBAR0 register. The addressing unit as a whole may not be optional, but necessary to implement a means of distinguishing the bus stations. Only the IAAR may be definitely optional and LBAR may also be optional, if some sort of "hard wiring" (preprogramming) of the address is used.

There are the following connections between the units of MIC:
  data output line 210 for data transmitted to bus DHIB arranged between transmitting unit M7 and input of driver TDD0,
  a control line 212 that is between sending/transmitting unit M7 and the control input of driver TDD0, a data input line 214 for data received from bus DHIB arranged between the output of receiver DR0 and receiving unit M6, a control line 216 from receiving unit to a control input of receiver DR0, SPI interface lines 20 between processor unit MCU and interface unit M9, see FIG. 4 for more details, a local addressed data bus 240 that may comprise a data bus and an address bus separated from each other or multiplexed. Bus 240 is between state engine 200, sending/transmitting unit M7 and match and general control unit M8.

control lines 244 between receiving unit M6 and unit M8, a match control line 246 between unit M8 and state engine 200 for the signaling of a match of addresses LBAR0, IAAB0 in match unit 800.

Furthermore, bus control unit MIC includes:

an exception signaling unit 300 having two inputs connected to bus DHIB and being able to detect or to initiate out of band signaling (OOB), a data buffer register 302 for intermediate storing of data tokens received via bus DHIB, a bus gate unit 310 for enabling data transfer from receiving unit M6, received bus 326*b*, to command token and address bus 326*a* between either unit M6 or command token generator (CTG) unit and internal arbitration unit 900 which is part of interface unit M9 and state engine 200, i.e. for preventing transmission conflicts. This is an enable gate 310. The other source of command tokens is the command token generator (CTG, 900) under control of the SPI engine 902. The state engine 200 may be a pure sink for the commands, i.e. a mere execution unit. Nevertheless state engine 200 may select the source to obtain the next command queued in from: If a command from SPI engine 902 is pending state engine 200 selects CTG as source and on demand even can actively terminate the present command to execute the one from the SPI engine 902. In most modern FPGA (Field Programmable Gate Array) and ASIC (Application Specific Integrated Circuit) implementations "busses" will not be implemented by separate transceivers for each source, but by a multiplexer which intrinsically prevents conflicts.

a bidirectional signaling line 320 between exception signaling unit 300 and state engine 200. For easier implementation this may be a three line point to point bus, not just one line: Enable (exception out) signal to the OOB (Out Of Band) driver, OOB signal state indicator (exception in) to the state engine 200, OOB data line (bidir)

a comma or separator signaling line 322 from receiving unit M6 to state engine 200, the command token and address bus 326*a* for the transmission of command tokens from receiving unit M6 or the command token generator (CTG, 900) to the state engine 200, the received token bus 326*b* for the transmission of received tokens from interface unit M9 to state engine 200 and of data and address tokens from receiving unit M6 via data buffer register 302 to local addressed data bus 240. Any token may consist of 8 bit and may be flagged by a ninth one either as data or as command. An address token thereby may be a data token that due to the preceding command is going to be interpreted as an address or as extension of a command (flags, etc.) by "addressing" a sub-command. Thereby addresses mainly may be handled by the data paths. They are just interpreted differently due to the control exerted by the state engine 200. Therefore, most address tokens may just be transferred to the [IAAR] or another address related register.

a data token bus 328 for the transmission of data tokens from receiving unit M6 to local addressed data bus 240. This bus could also be a branch of received token bus 326*b* rather than command token and address bus 326*a* since on this bus data tokens which are not being interpreted as command extension only can originate in M6. This will be determined by implementation needs.

status and control line(s) 330 between state engine 200 and data buffer register 302, a dummy clock enable line 332 from state engine 200 to sending/transmitting unit M7 for controlling the generation of dummy clock data on bus DHIB, control lines 333 from state engine 200 to sending/transmitting unit M7 and match and general control unit M8 for general control purposes, a command token bus line 334 from state engine 200 to sending/transmitting unit M7 for the transmission of command tokens that shall be transmitted via bus DHIB to the SLCs, a synchronization clock line 342 that transmits a clock signal to other units of MIC especially while receiving data via bus DHIB and that is generated inside receiving unit M6, and a bus line 350 between match and general control unit M8 and DET control unit 204 for transmitting data that sets high or low state at the DET and DETB pins of control unit 204.

Figure 3:
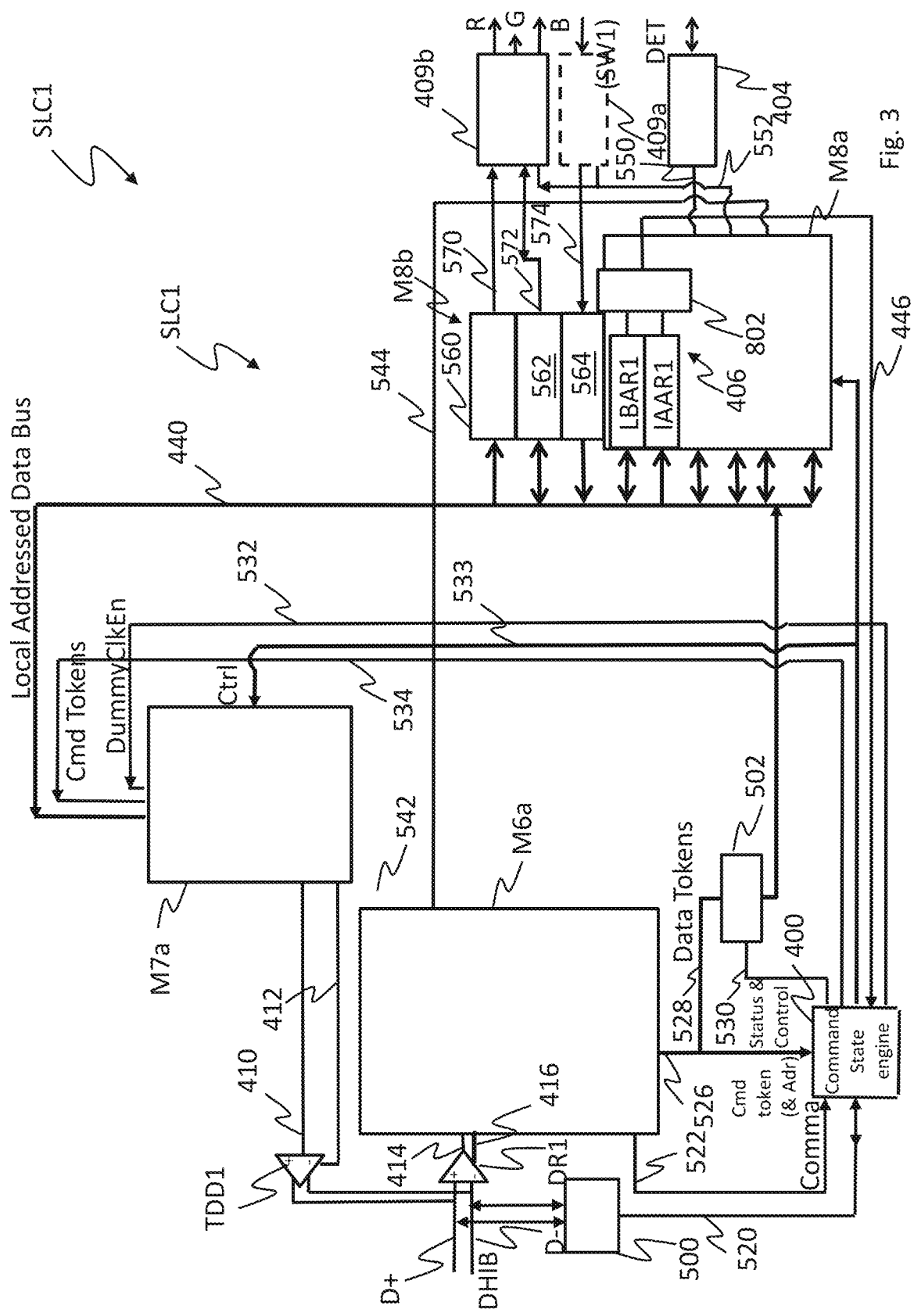
FIG. 3 illustrates sub units of a bus unit (SLC)

FIG. 3 shows sub units of a bus unit (SLC), for instance of SLC1. There are the following similarities between the MIC shown in FIG. 2 and the SLC1 shown in FIG. 3. With regard to the connection of these elements reference is made to the respective elements that have been described with regard to FIG. 2 above. The corresponding elements are shown in round brackets: state engine 400 (SLC) (200 MIC), receiving unit M6*a* (M6), sending/transmitting unit M7*a* (M7), match and general control unit M8*a* (M8), DET control unit 404 (204), address and match unit 406 (206), address register LBAR1 (LBAR0), counter register IAAR1 (IAAR0), match unit 802 (800), tristate differential driver TDD1 (with special state driving) (TDD0), differential receiver DR1 (with special state detect) (DR0), data output line 410 (to bus) (210), control line 412 (212), data input line 414 (from bus) (214), control line 416 (216), local addressed data bus 440 (data bus and address bus separate or multiplexed) (240), match control line 446 (246), exception signaling unit 500 (300), data buffer register 502 (302), signaling line 520 (320), comma signaling line 522 (322), data token bus 528 (328), status and control line 530 (330), dummy clock enable line 532 (332), control lines 533 (333), command token line 534 (334), synchronization clock line 542 (342), connection lines 550 (350).

There are the following differences:

address registers LBAR1 to LBAR*n* and counter registers IAAR1 to IAAR*n* are mandatory in SLCs, the DET control unit 404 does not have a second input/output pin, i.e. DETB, an optional switch sample unit 409*a* that is coupled to key switch SW1 and that determines how deep key switch SW1 is pressed down, an LED control engine 409*b* that is coupled to one, two or three LEDs, i.e. a red one R, a green one G and a blue one B, or to more than three LEDs, a command token and address bus 526 between receiving unit M6a and state engine 400. There is no bus gate unit in the SLC corresponding to bus gate unit 310. Furthermore, there is no bus that corresponds to bus 326a because there is no interface unit M9 in SLCs.

connection lines 552 from unit M8a to switch sample unit 409a and to LED control engine 409. It is for instance possible to transmit the state of control flags via lines 552.

Furthermore, there is a second part M8b of match and general control unit M8 of SLC, SLC1 including:
a register 560 (ILPCDR—Intermediate LED (light emitting diode) PWM control register) for controlling PWM (pulse width modulation) of the LEDs R, G and B,
a register 562 (ILDCDR and LSTAT—Intermediate LED dot correction control register and LED status register) for controlling further functions of the LEDs, i.e. bin correction, on/off etc., and
an optional register 564 (ISSOR—Intermediate switch sample output register) that stores the sample value that is sampled from switch SW1 for instance using an ADC.

A connection line 570 is between register 560 and LED control engine 409b. A further connection line 572 is between register 562 and LED control engine 409b. A third optional connection line 574 is between register 564 and switch sample unit 409a. All three registers 560, 562 and 564 are also connected to local addressed data bus 440, i.e. register 560 for write access, register 562 for read or write access and register 560 for read access. Further registers DCR0 to DCR3 of match and general control unit M8a and M8b will be described below.

The receiving unit M6, M6a may comprise:
an edge detector and filter unit that receives its input from receiver DR0 or DR1,
a clock recuperation and synchronization unit that may receive its input from the edge detector and filter unit,
a phase alignment unit that may receive input from receiver DR0 or DR1 and from clock recuperation and synchronization unit,
a 10 bit shifter unit that may be coupled to the phase alignment unit,
a history buffer that may store the previously received symbol,
a modified 8b/10b decoder, the optional modifications may be made with regard to a decoder as described in the article of A. X. Widmer, Peter A. Franaszek, "A DC-Balanced, Partitioned-Block, 8B/10B Transmission Code", IBM J. RES. DEVELOP., Vol. 27, No. 5th September 1983, pp. 440 to 451, and in the literature listed at the end of this article. Some of the modifications will be explained below in more detail. The modified 8b/10b decoder may receive its input from the 10 bit shifter and from the history buffer.
a comma detection unit that detects the comma separator of the frames transmitted on bus DHIB and signals its presence to the respective state engine 200 or 400. The comma detection unit may be closely coupled to the modified 8b/10b decoder.
a command detection unit for detecting commands that have been transmitted via the bus DHIB.

An output of the clock recuperation and synchronization unit may output a synchronization clock on line 342 or 542 for other units of the MIC or SLC. Furthermore clock recuperation and synchronization unit may be coupled to control lines 244 (544). The command detection unit may be coupled to received token bus 326b (526).

The transmitting unit M7, M7a may comprise:
a data out buffer and special code insertion unit,
an out FIFO unit that may store 4 tokens for example and that receives its inputs from the data out buffer and special code insertion unit,
a modified or not modified 8b/10b encoder unit that receives its input from the out FIFO unit, and
a 10b (bit) output shifter unit that receives its input from the modified 8b/10b encoder.

The local addressed data bus 240 or 440 is connected to the input of data out buffer and special code insertion unit which also receives command tokens via command token line(s) 332 respectively 532. Dummy clock enable line 332 is also connected with data out buffer and special code insertion unit. The output of the 10b output shifter unit is connected with the input of driver TDD0 or TDD1. All units except the FIFO unit are controlled by the control lines 333.

The match and general control unit M8 comprises the registers that are mentioned in the following in addition to the registers LBAR0 (Local Bus Address Register, address register) and IAAR0 (Imminent Access Address Register, counter register) as well as the match unit 800. The match and general control unit M8a also comprises the registers that are mentioned in the following in addition to the registers LBAR1 (Local Bus Address Register) and IAAR1 (Imminent Access Address Register, counter register) as well as the match unit 802:
register DCR0 that has a bidirectional connection to DET (Determine) control unit 204 or to DET control unit 404,
register DCR1 that is connected with lines 552 in unit M8a. These lines 552 may carry the control bits from [DCR1]: enable, mode bits, test flags, etc.—register DCR2 that is connected with control lines 244, 544, and
register DCR3 that may be used for other purposes.

Local addressed data bus 240, 440 is connected bidirectionally, i.e. for sending and receiving, to all four registers DCR0 to DCR3 in both units M8 and M8a. Control lines 244, 544 may carry control bits, mostly clock mode controls, from DCR2 to receiving unit M6 and M6a and may allow the read back of some status bits from the receiving unit M6, M6a.

FIG. 4 shows sub units of an interface unit M9 within the bus control unit (MIC). The interface unit M9 comprises:
a second part 900 of state machine/engine of bus control unit MIC,
an SPI (Serial Peripheral Interface) engine 902 that is available in the market,
a command and data separator unit 904,
an input FIFO 906 (write W-FIFO—First In First Out)
an output FIFO 908 (read R-FIFO),
a command token generator (CTG) unit and internal arbitration unit 910
may create internal command tokens to be executed by the state machine 200 upon receiving a transfer from SPI engine 902 for the DHIB or for local register access. Some very basic commands may be directly processed by the CTG by arbitrating internal control lines, for example "hard" resetting the chip. Since the state engine 200 is built for processing DHIB commands, any command coming in via SPI engine 902 may be translated into an appropriate local command token, which may be executed the normal way by the state machine 200, like in an SLC. In order to distinguish those locally created tokens from those received via the DHIB tokens may be used that have no legal symbol encoding on the DHIB, but nevertheless share most of the bit pattern with their functional DHIB equivalent. In execution there may be no difference except of the data flow: Commands transferring data to DHIB are using the W-FIFO as data source instead of the register file of match and general control unit M8, while commands transferring data from DHIB may use the R-FIFO instead of the register file. Local transfers (between local register file and the SPI engine 902) may replace the receiving unit M6 and the sending/transmitting unit M7 by the appropriate FIFO. However, a few commands may not fit into this scheme like "RESET", local power down and unlocking setup bits that in their present state are explicitly protected from changing by a DHIB access. These commands may be directly executed by the CTG by directly arbitrating the appropriate control lines.

- a bus gate 912 between the output of unit 910 and command token and address bus 326a,
- an exception output line/EXCP as part of control lines 22,
- a "ready" output line/Ready as part of control lines 22
- a "wait" output line/Wait as part of control lines 22
- an "enable" input line/EN as part of the standard SPI interface 20,
- a clock line SCLK as part of the standard SPI interface 20,
- an input line MOSI as part of the standard SPI interface 20,
- an output line MISO as part of the standard SPI interface 20,
- a transaction indicator line 920 between SPI engine 902 and unit 904 indicating a continuous transaction,
- a clock line 922 between SPI engine 902 and unit 904,
- a start signaling line 924 between SPI engine 902 and unit 904,
- a data line 926 between SPI engine 902 and unit 904,
- a clock line 930 for R-FIFO 908 between SPI engine 902 and output FIFO 908,
- a data output line 932 of R-FIFO 908 connected with an input of SPI engine 902,
- an input clock line 940 of input or W-FIFO 906 coming from command and data separator unit 904,
- a data input line 942 of input or W-FIFO 906 coming from command and data separator unit 904,
- an error signaling line 950 (FF_Err) coming from FIFOs 906, 906 and going to the second part 900 of the state engine of the bus control unit MIC signaling an overflow or underflow,
- an output clock line 960 of W-FIFO 906 going to second part 900 of state engine,
- an input clock line 962 of R-FIFO 908 coming from second part 900 of state engine,
- a bus wait line 964 coming from output NE (Near Empty) of input FIFO 906 and from output NF (Nearly Full) of output FIFO 908 and connected to second part 900 of state machine, i.e. forming a signal DHIBFF_Wait. In the Figure these lines are shown as a "wire or" which may not be available in modern chips any more. So the creation of DHIBFF_Wait may probably be implemented using a "real" or gate.
- an output enable/disable line 966 connected to a respective input of W-FIFO 906 for controlling and synchronizing the data output to the local addressed data bus 240,
- a control line 970 (WFF_NFull) coming from a respective control output of input FIFO 906 and going to the second part 900 of state engine for signaling that input FIFO 906 is nearly full,
- a command signal line 980 from command and data separator unit 904 to command token unit and internal arbitration unit 910,
- a control line 990 (SPI_Pend) from unit 910 to second part 900 of state engine 200 for signaling that SPI data has been received, and
- bus gate control line 992 from second part 900 of state engine 200 to bus gate 912 for opening or closing this electronic gate 912. Bus gate control line 992 is also connected to bus gate 310, see FIG. 2.

Local addressed data bus 240 is also connected with data output of input FIFO 906 and with data input of output FIFO 908.

Figure 5:
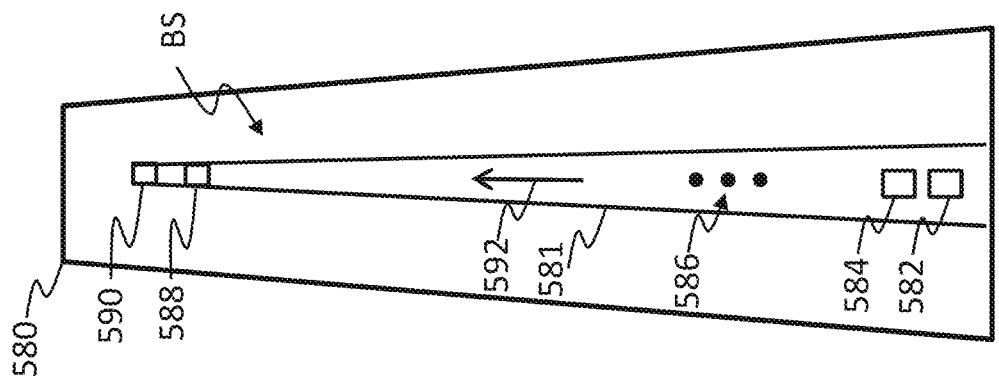
FIG. 5 illustrates a building having an LED stripe on the frontage.

FIG. 5 illustrates a building 580 having an LED stripe 581 on the frontage. The building 580 is for instance a building having at least 5 floors, i.e. a height of at least 15 meters, or alternatively having at least 20 floors, i.e. a height of at least 60 meters. The LED stripe 581 may have the same lengths The LED stripe 581 is based on bus system BS described with reference to FIGS. 1 to 4 above and comprises for instance at least 100 bus units 582 to 590. Each bus unit comprises three LED elements. The distances between adjacent bus units 582 to 590 are equal with regard to each other or may be unequal. In the example there are no switches SW1 etc. connected to the bus units 582 to 590.

An arrow indicates the direction 592 of a running light that runs from the bottom to the top of building 580. It is easy to implement the running light using single write or block write commands on bus system BS. Segmentation may be used, for instance using 5 or ten consecutive bus units SLC within one segment. The data for the first block write is for instance [1,0,0,0,0], i.e. the light is switched on for the first SLC1 and off for SLC2 to SLC5, then with waiting or without waiting block write data [0,1,0,0,0], i.e. the light is switched on for the second SLC3, and so on.

There may be several programs for operating LED stripe 581 and they may be changed automatically, for instance several times within an hour. According to a second program the light point may be run from top to button, i.e. in the opposite direction. Other programs may involve two, three or more than three running light points. Furthermore, the color of the light point may be changed if the program changes. However changes of colors may also take place during the wandering of the light point that is controlled by one of the programs, i.e. during the way from bottom to top or vice versa. Power LEDs may be used on the stripe 581. There may be special features on stripe 581 in order to protect the electronic elements, SLCs, LEDs, bus wires D−, D+, from environmental influences like rain, wind, snow, cold temperatures, hot temperatures etc.

Figure 6:
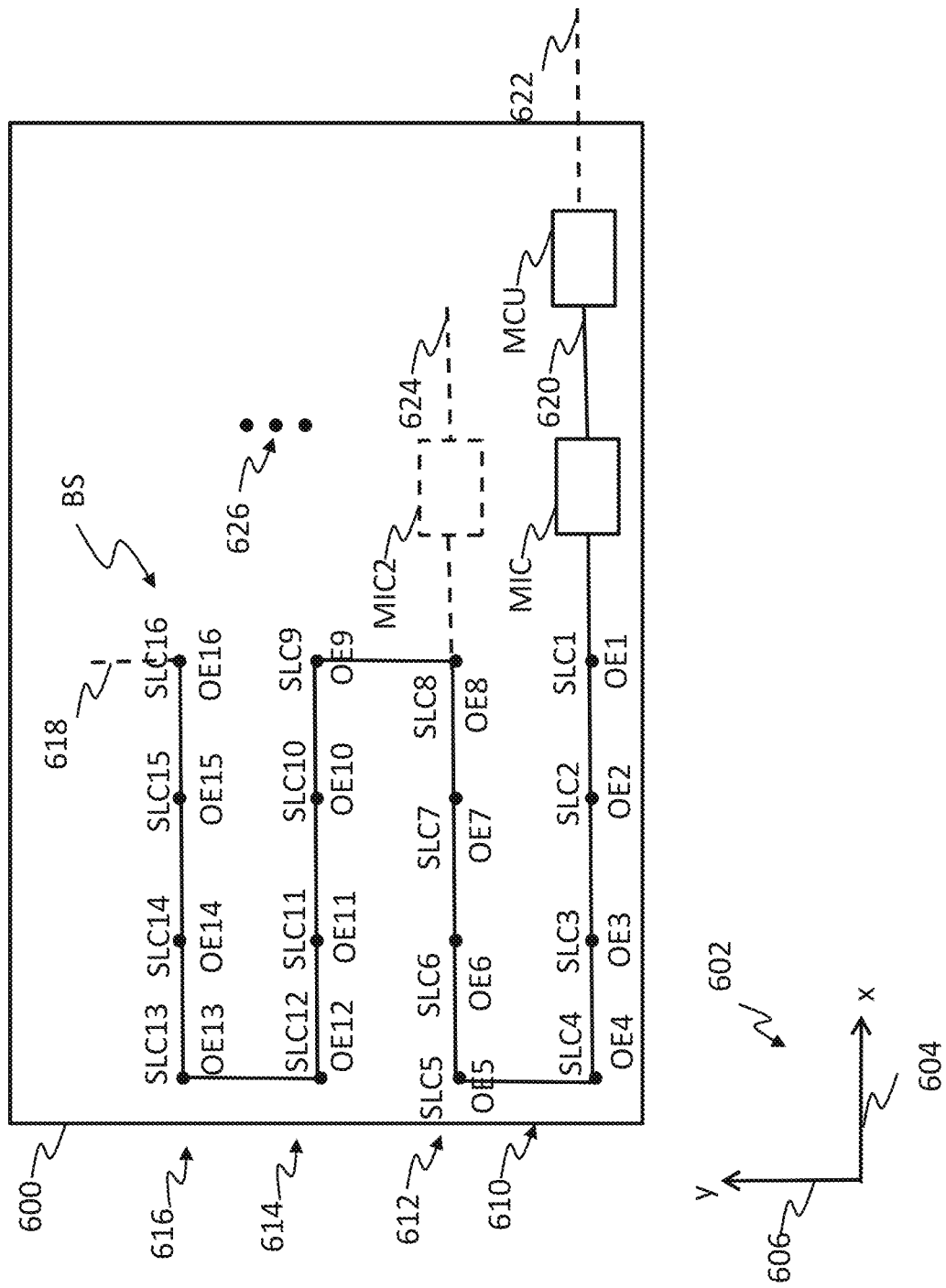
FIG. 6 illustrates a 2D display device.

FIG. 6 illustrates a 2D (two dimensional) display 600. The display 600 comprises the bus system BS described with reference to FIGS. 1 to 4 above. However, no input switches SW1 etc. are used. A Cartesian system of coordinates 602 comprises a horizontal x-axis 604 and a vertical y-axis 606. The bus system BS in display 600 has straight sections 610 to 616 extending along the x-axis 604 and each comprising four SLCs. These straight sections 610 to 616 are parallel with regard to each other and are connected by intermediate sections that do not include SLCs. Further sections 618 of bus system BS are indicated by dots. Thus, bus system BS extends in display 600 in a meandering way within a plane.

In FIG. 6 the following straight sections 610 to 618 are shown:
straight sections 610 including SLC1 to SLC4 (from right to left), i.e. optical output elements OE1 to OE4, straight sections 612 including SLC5 to SLC8 (from left to right), i.e. optical output elements OE5 to OE8, straight sections 614 including SLC9 to SLC12 (from right to left), i.e. optical output elements OE9 to OE12, and straight sections 616 including SLC13 to SLC16 (from left to right), i.e. optical output elements OE13 to OE16.

There are equal distances between adjacent bus units/output elements, for instance between OE1 and OE2, OE 2 and OE3, and so on. Alternatively, there may be applications with unequal distances.

However, the 2D display 600 may comprise more than 100, more than one thousand or even more bus units in order to have the resolution that is necessary for the respective application.

Connection lines 620 connect the MIC and the MCU of bus system BS within display 600. The MCU may be connected to a local or remote computer system by an interface 622, for instance an USB (Universal Serial Bus), Bluetooth, LAN (Local Area Network), WLAN (Wireless LAN), WIMAX (Worldwide Interoperability for Microwave Access) etc.

Optical output elements OE1 to OE16 etc. comprise only one LED for a monochrome display. Alternatively optical output elements OE1 to OE16 etc. comprise groups of three LEDs, for instance a red R one, green G one and blue B one for a color display. There may also be more than three LEDs in each of the groups.

2D Display 600 may be used to display more static information as in industrial control panels, displays in stadiums, displays in bus or train stations or airports etc. Alternatively, 2D display 600 may be used to display 2D light shows for advertising, for instance. More sophisticated displays 600 may show movies, TV (television) programs, video data, blue ray data etc.

More sophisticated displays 600 may comprise further bus systems 626, for instance for each section 610 to 616 etc. a separate bus system. The first bus system would comprise only the SLCs and OEs of the first straight section 610 in this case, i.e. SLC1 to SLC4 and further SLCs that are not depicted. The second bus system is shown in more detail, i.e. comprising a bus control unit MIC2 that has the same functions as the first bus control unit MIC, see FIGS. 1 and 2 and corresponding description. Connection lines, for instance 624, of further bus systems 626 may be connected to the MCU of the first bus system or to their own MCU. In the last case the MCUs of the bus systems may be connected to a super ordinated MCU. This super ordinated MCU may have an interface to a local or remote computer system. Alternatively, the MCUs of each bus system may have their own interfaces. There may be units that allow synchronization of transmitted data for the case in which several bus systems are used within the same display 600. However this synchronization is optional.

Figure 7:
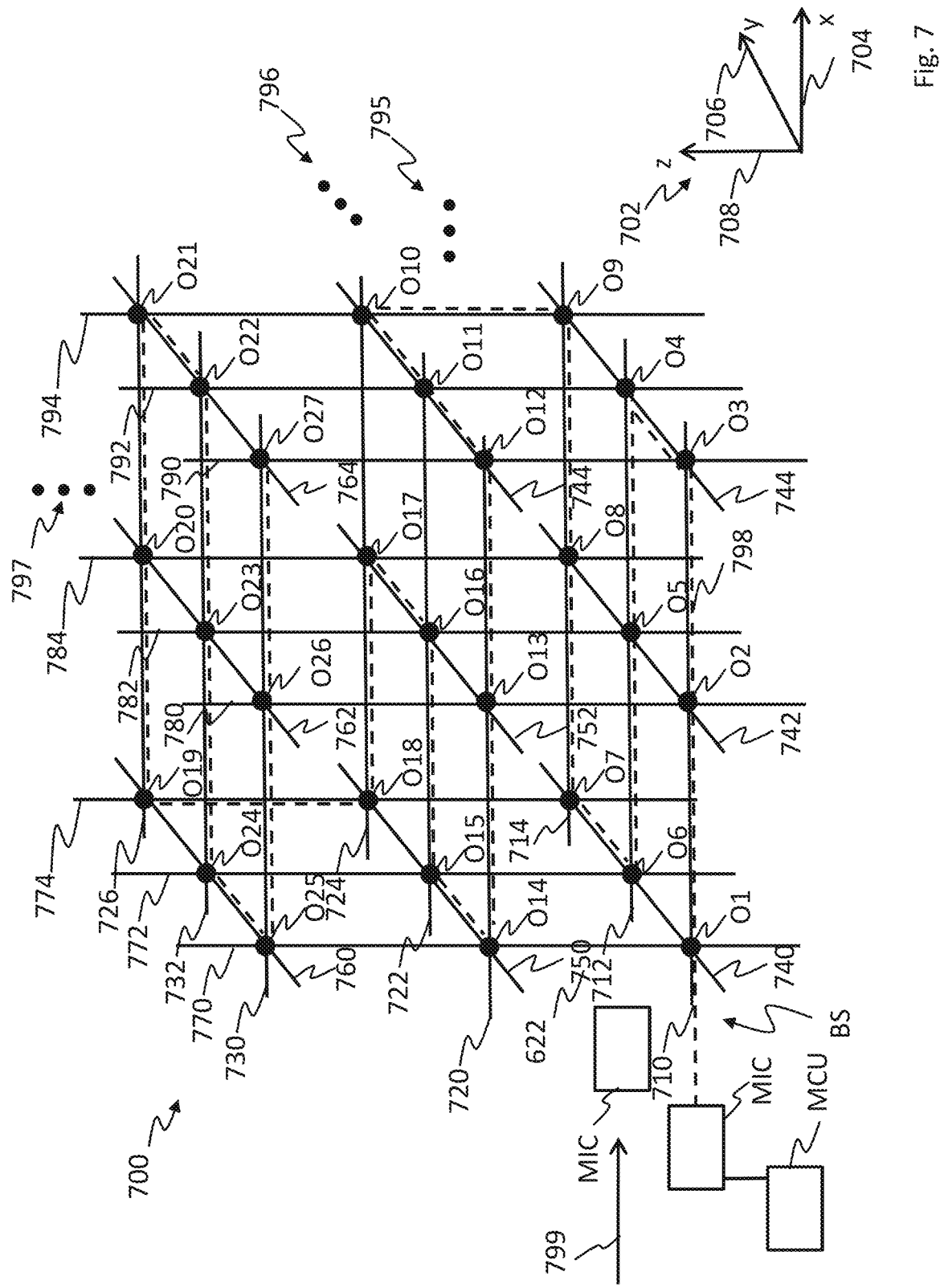
FIG. 7 illustrates a 3D display device.
Figure 8A:
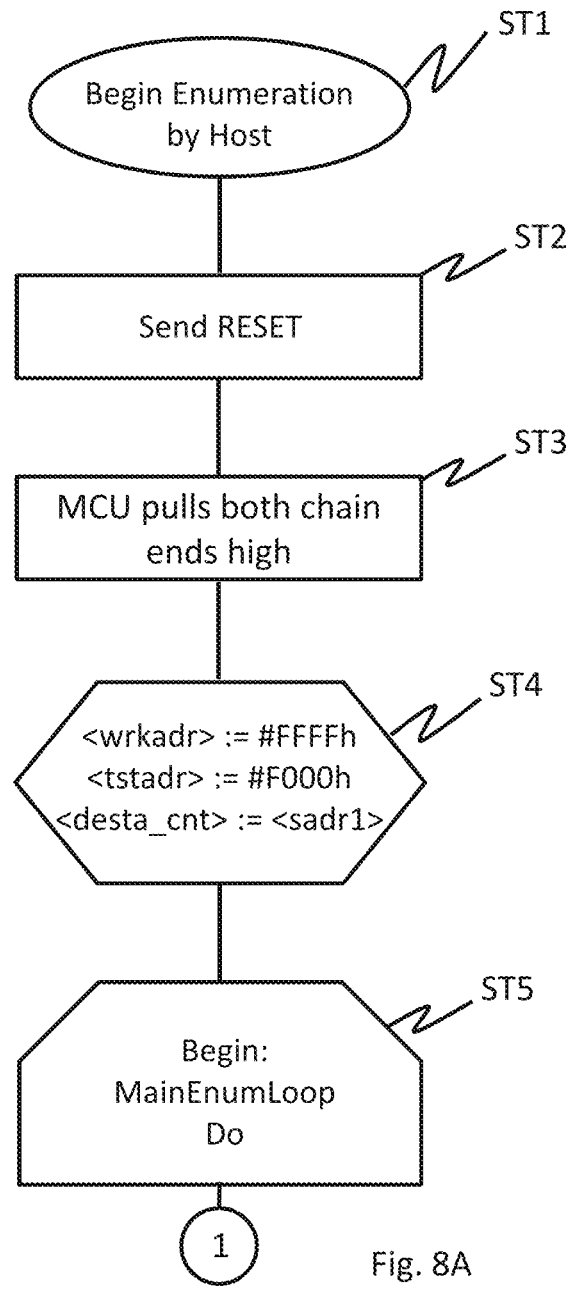
FIGS. 8A to 8E illustrate a process flow for address allocation using Schmitt trigger (ST) circuits within bus units (SLC).
Figure 8B:
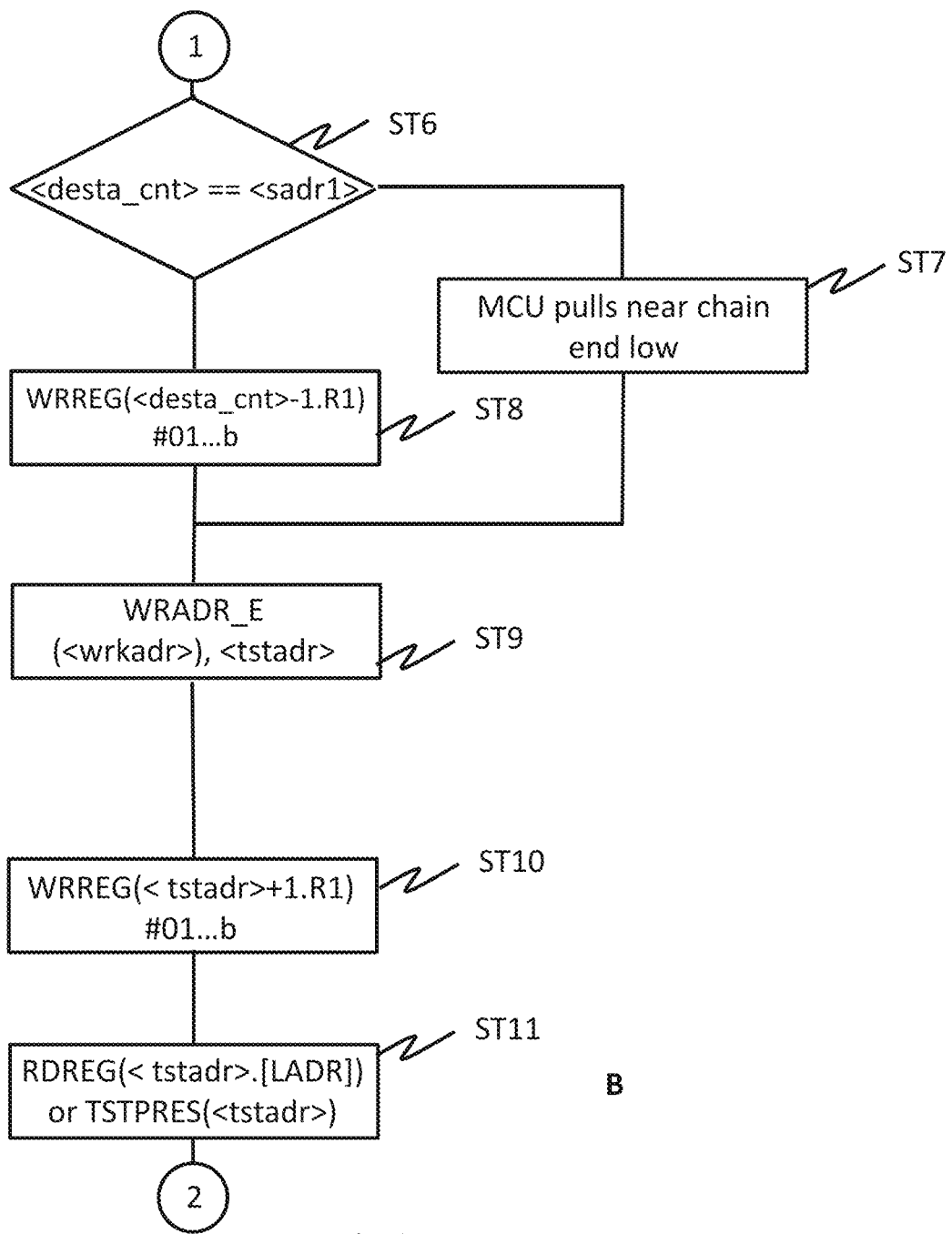
Figure 8C:
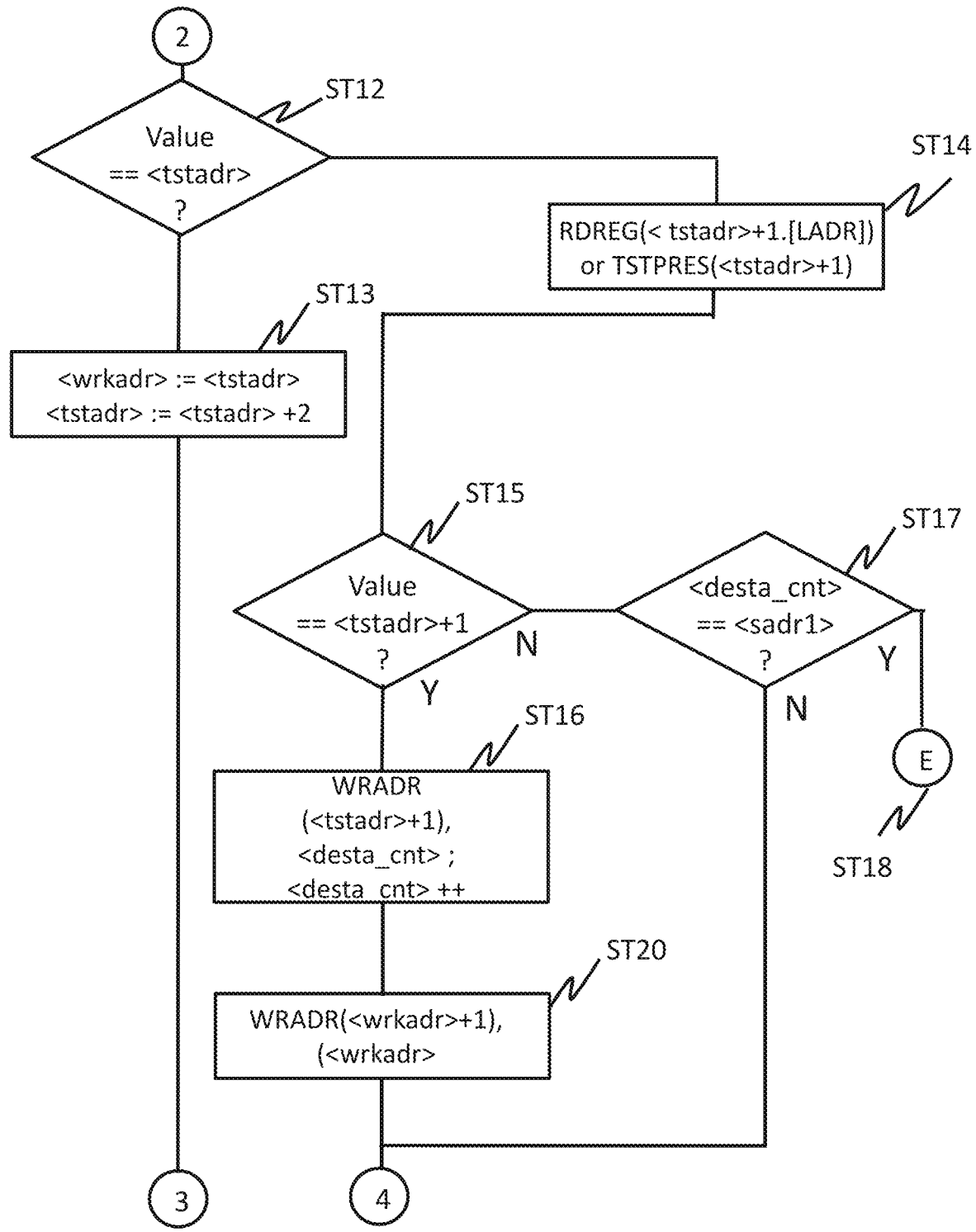
Figure 8D:
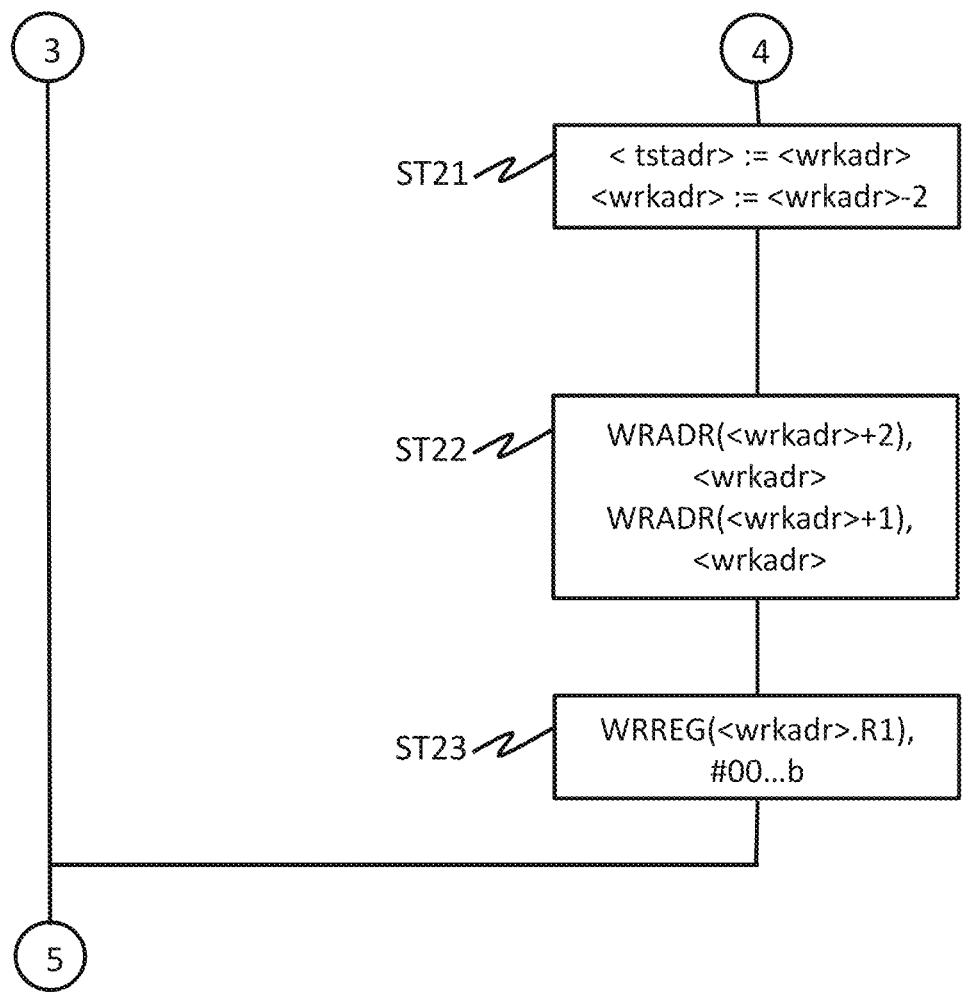
Figure 8E:
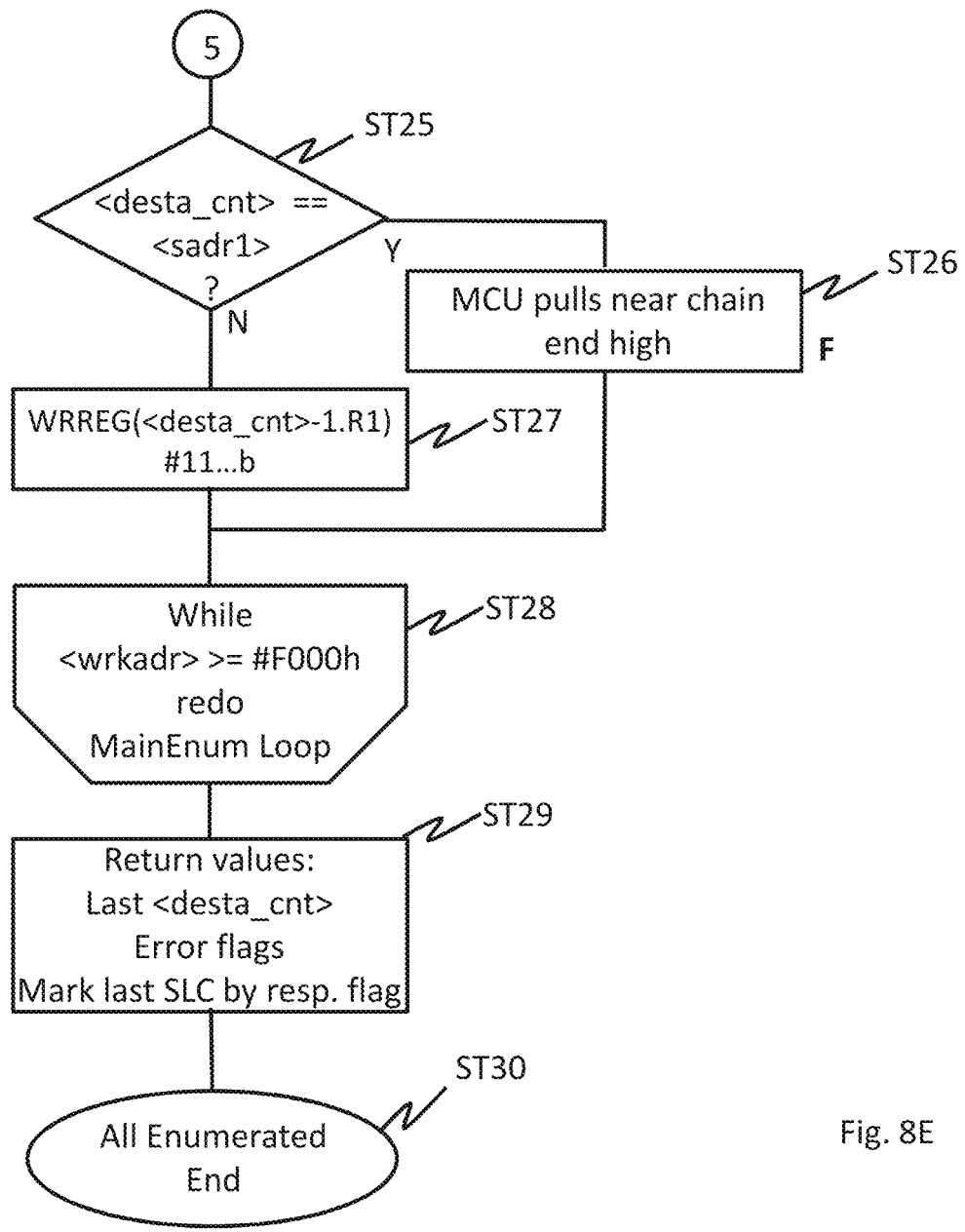

FIG. 7 illustrates a 3D (three dimensional) display 700. The display 700 comprises bus system BS described with reference to FIGS. 1 to 4 above. However, no input switches SW1 etc. are used. A Cartesian system of coordinates 702 comprises a horizontal x-axis 704, a horizontal y-axis 706 and a vertical z-axis 708. The bus system BS in display 700 is meandering and has straight sections with several bus units SLC and corresponding output elements O1 to O27. The bus system BS in display 700 is carried by a grid that has the following mounting wires:

mounting wires in x-direction, see for instance nine horizontal mounting wires 710 to 734, mounting wires in y-direction, see for instance nine horizontal mounting wires 740 to 764, and mounting wires in z-direction, see for instance nine vertical mounting wires 770 to 794.

Mounting wires 710 to 794 may be connected on their crossing points by welding, soldering, by using glue or other known connection methods. After or during making the connection on the cross points of mounting wires 710 to 794 the bus units SLC and the output elements O are connected to the cross points as well.

The bus system BS extends along the following path in 3D display 700:

lower x-y-plane:

first straight section including output elements O1 to O3 (from left to right) and corresponding SLCs, extending one grid distance in y-direction, second straight section including output elements O4 to O6 (from right to left) and corresponding SLCs, extending one grid in y-direction, third straight section including output elements O7 to O9 (from left to right) and corresponding SLCs, extending one grid upwards in z-direction and into the middle x-y-plane, middle x-y plane:

along transverse (opposite to y-direction) straight section including output elements O10 and O11 and corresponding SLCs, first straight section including output elements O12 to O14 (from right to left) and corresponding SLCs, extending one grid distance in y-direction, second straight section including output elements O15 and O16 (from left to right) and corresponding SLCs, extending one grid in y-direction, third straight section including output elements O17 and O18 (from right to left) and corresponding SLCs, extending one grid upwards in z-direction and into the upper x-y-plane, upper x-y-plane:

first straight section including output elements O19 to O21 (from left to right) and corresponding SLCs, extending one grid distance opposite to y-direction, second straight section including output elements O22 to O24 (from right to left) and corresponding SLCs, extending one grid opposite to y-direction, third straight section including output elements O24 and O27 (from left to right) and corresponding SLCs.

Further planes 795 to 797 of output elements O are indicated by dots. Other paths are also possible for bus system BS within 3D Display 700.

3D Display 700 may be used to display more static information as in control panels, displays in stadiums, bus or train stations or airports etc. Alternatively, 3D display 700 may be used to display 3D light shows for advertising, for instance. More sophisticated displays 700 may show 3D animations or even 3D movies.

More sophisticated displays 700 may comprise further bus systems, for instance for each straight section along horizontal mounting wires 710 to 734 etc. a separate bus system. The first bus system would comprise only the bus units SLCs and output elements O of the first straight section in this case, i.e. output element O1 to O3 and further output elements O that are not depicted. The second bus system 799 is shown in more detail, i.e. comprising a further bus control unit MIC that has the same functions as the first bus control unit MIC, see FIGS. 1 and 2 and corresponding description. Connection lines of further bus systems 799 may be connected to the MCU of the first bus system or to their own MCU. In the last case the MCUs of the bus systems may be connected to a super ordinated MCU. This super ordinated MCU may have an interface to a local or remote computer system. Alternatively, the MCUs of each bus system may have their own interfaces. There may be units that allow synchronization of transmitted data for the case in which several bus systems are used in the same display 700. However this synchronization is optional.

Alternatively display 700 may comprise several glass substrates that form a stack, see first part of description for more details.

There are for instance the following methods for allocating addresses to bus units SLCs and/or to subordinated bus control units MICs at bus DHIB.

First Method:
 using ADCs within the bus units SLC and/or within the subordinated bus control units MIC and a chain 4 of resistors R0 to Rn,
 pull first end of chain 4 to low and pull second end of chain 2 to high potential,
 sample all taps of chain 4 at the same time, and
 use sample values as part of addresses for the SLCs/subordinated MICs,
 optionally: read all possible addresses and rearrange in order to get address space without gaps.

Second Method:
 same as first method but partitioning of address space is used in order to form partitions that allow sampling of the values on the taps of resistor chain 4 only for a segment/partition. SLCs in previous partition may pull taps to low and SLCs in following partitions may pull taps to high. The resolution of potential values in the respective "middle" partition is improved considerably reducing detection errors and influence of interference. This may be done for all segments/partitions.

Third Method:
 same as second method but with using a uniting of two adjacent partitions combined with sampling of values only within the united partition. This may reduce further errors during the allocation of addresses.

Fourth method: using Schmitt Trigger circuits on the taps of chain 4 of resistors R0 to Rn.

Fifth method: Using one of the first to fourth method and storing the addresses that have been allocated in a non-volatile memory for further use after allocation.

Using the process flow shown in FIG. 8A to 8E the allocation goes on as shown in the following table. Z means a high ohmic output state on the DET pins of DET control units 404 of SLCs and subordinated MICs if any. The Schmitt trigger circuits may be centered to half Vdd and may have a range of for instance 0.8 Volt if Vdd is 3.3 Volt for instance. The letters A to D that are shown in FIGS. 8A to 8E are also used in the following table in order to ease the orientation, i.e. the mapping between both kinds of descriptions for the same allocation method. The table has a left part, a middle part and a right part which have to be put together using the same line numeration.

There is a command TSTPRES (<tstadr>) that was not mentioned above but which has the same function as the command RDREG (<tstadr>.[LADR]) that was mentioned above. Basically it replaces the RDREG(<tstadr>.[LADR]) and the subsequent decision must be replaced by a decision like "SLC found?". The decisions to be replaced are at the end of FIG. 5B (step ST11) and at the upper right of FIG. 5C (step ST14). Step ST14 has to be replaced by TSTPRES (<tstadr>+1). The directly following decision has to be rewritten as "SLC found?", i.e. step ST12 and step ST15.

Register R1 refers to the DET control unit. The left bit stands for the pin value. A write to the DET pin sets the DET pin to the pin value of the left bit. A read to the DET pin reads the external to the left pin. The second bit from left is 1 for output mode and 0 for input mode. If input mode is active, i.e. the second bit is 0 this means that the DET pin is high ohmic connected to chain 4, i.e. state "Z". If the DET pin is in output mode, i.e. the second bit is 1 the DET pin is driven with the value set by the first bit.

x0 (00 or 10): DET pin is in input mode, for instance step ST23, high ohmic, result of input read is 0 if DET pin is pulled high externally and 1 if it is pulled low externally. The output bit value (first bit) is ignored in input mode. A read always directly will read the external value.

01: output zero, for instance step ST8,
11: output one, for instance step ST10, ST27.

The addresses of all SLCs are not shown in every line of the table. In order to ease understanding the addresses are mainly shown if there is a change in addresses.

This is the left part of the table:

| | Command (Symbolic) | Mark | Command/State | Det In | Det Out |
|---|---|---|---|---|---|
| 1 | | | | | |
| 2 | | | Reset & Ends High | 111111 | ZZZZZZ |
| 3 | | | | | |
| 4 | | A | Near End := Low | 001011 | |
| 5 | WRADR_E (<wrkadr>), <tstadr> | | WRADR_E (#FFFFh), #F000h WRREG (#F001h.Ra), | | |
| 6 | WRREG (<tstadr> + 1.R1), #11 . . . b | | #11 . . . b | 011111 | ZZ1Z11 |
| 7 | TSTPRES (<tstadr>) | B | TSTPRES (#F000h) | | |
| 8 | | F | Near End := High | 111111 | ZZ1Z11 |
| 9 | | | | | |
| 10 | | A | Near End := Low | 011111 | ZZ1Z11 |
| 11 | WRADR_E (<wrkadr>), <tstadr> | | WRADR_E (#F000h), #F002h WRREG (#F003h.R1), | | |
| 12 | WRREG (<tstadr> + 1.R1), #11 . . . b | | #11 . . . b | 011111 | Z11Z11 |
| 13 | TSTPRES (<tstadr>) | B | TSTPRES (#F002h) | | |
| 14 | | F | Near End := High | 111111 | Z11Z11 |
| 15 | | | | | |
| 16 | | A | Near End := Low | 111111 | Z11Z11 |
| 17 | WRADR_E (<wrkadr>), <tstadr> | | WRADR_E (#F002h), #F004h WRREG (#F005h.R1), | | |
| 18 | WRREG (<tstadr> + 1.R1), #11 . . . b | | #11 . . . b | 111111 | 111Z11 |
| 19 | TSTPRES (<tstadr>) | B | TSTPRES (#F004h) | | |
| 20 | TSTPRES (<tstadr> + 1) | C | TSTPRES (#F005h) | | |
| 21 | WRADR (<tstadr> + 1), <desta_cnt> | | WRADR (#F005h), #0000h | | |
| 22 | WRADR (<wrkadr> + 1), <wrkadr> | | WRADR (#F003h), #F002h | | |
| 23 | | | (Rollback shelved) | | |

-continued

| | | | | |
|---|---|---|---|---|
| 24 | WRADR (<wrkadr> + 2), <wrkadr> | WRADR (#F002h), #F000h | | |
| 25 | WRADR (<wrkadr> + 1), <wrkadr> | WRADR (#F001h), #F000h | | |
| 26 | WRREG (<wrkadr>.R1), #00 . . . b | WRREG (#F000h.R1), #00 . . . b | 111111 | 1ZZZZZ |
| 27 | F | Near End := High (1st SLC) | 111111 | 1ZZZZZ |
| 28 | | | | |
| 29 | A | Near End := Low (1st SLC) | 000111 | 0ZZZZZ |
| 30 | WRADR_E (<wrkadr>), <tstadr> | WRADR_E (#F000h), #F002h | | |
| 31 | WRREG (<tstadr> + 1.R1), #11 . . . b | WRREG (#F003h.R1), #11 . . . b | 001111 | 0ZZ111 |
| 32 | TSTPRES (<tstadr>) | TSTPRES (#F002h) | | |
| 33 | B F | Near End := High (1st SLC) | 111111 | 0ZZ111 |
| 34 | | | | |
| 35 | A | Near End := Low (1st SLC) | 001111 | 0ZZ111 |
| 36 | WRADR_E (<wrkadr>), <tstadr> | WRADR_E (#F002h), #F004h | | |
| 37 | WRREG (<tstadr> + 1.R1), #11 . . . b | WRREG (#F005h.R1), #11 . . . b | 001111 | 0Z1111 |
| 38 | TSTPRES (<tstadr>) B | TSTPRES (#F004h) | | |
| 39 | F | Near End := High (1st SLC) | 111111 | 1Z1111 |
| 40 | | | | |
| 41 | A | Near End := Low (1st SLC) | 011111 | 0Z1111 |
| 42 | WRADR_E (<wrkadr>), <tstadr> | WRADR_E (#F004h), #F006h | | |
| 43 | WRREG (<tstadr> + 1.R1), #11 . . . b | WRREG (#F007h.R1), #11 . . . b | 001111 | 011111 |
| 44 | TSTPRES (<tstadr>) B | TSTPRES (#F004h) | | |
| 45 | TSTPRES (<tstadr> + 1) C | TSTPRES (#F005h) | | |
| 46 | WRADR (<tstadr> + 1), <desta_cnt> | WRADR (#F007h), #0001h | | |
| 47 | WRADR (<wrkadr> + 1), <wrkadr> | WRADR (#F005h), #F004h | | |
| 48 | | (Rollback to shelved) | | |
| 49 | WRADR (<wrkadr> + 2), <wrkadr> | WRADR (#F004h), #F002h | | |
| 50 | WRADR (<wrkadr> + 1), <wrkadr> | WRADR (#F003h), #F002h | | |
| 51 | WRREG (<wrkadr>.R1), #00 . . . b | WRREG (#F002h.R1), #00 . . . b | 000111 | 01ZZZZ |
| 52 | F | Near End := High (2nd SLC) | 011111 | 01ZZZZ |
| 53 | | | | |

This is the middle part of the table:

| | Adr (SLC1) | Adr (SLC2) | Adr (SLC3) | Adr (SLC4) | Adr (SLC5) | Adr (SLC6) |
|---|---|---|---|---|---|---|
| 1 | | | | | | |
| 2 | #FFFFh | #FFFFh | #FFFFh | #FFFFh | #FFFFh | #FFFFh |
| 3 | | | | | | |
| 4 | #FFFFh | #FFFFh | #FFFFh | #FFFFh | #FFFFh | #FFFFh |
| 5 | #F000h | #F000h | #F001h | #F000h | #F001h | #F001h |
| 6 | #F000h | #F000h | #F001h | #F000h | #F001h | #F001h |
| 7 | | | | | | |
| 8 | | | | | | |
| 9 | | | | | | |
| 10 | | | | | | |
| 11 | #F002h | #F003h | #F001h | #F003h | #F001h | #F001h |
| 12 | | | | | | |
| 13 | | | | | | |
| 14 | | | | | | |
| 15 | | | | | | |
| 16 | | | | | | |
| 17 | #F005h | #F003h | #F001h | #F003h | #F001h | #F001h |
| 18 | | | | | | |
| 19 | | | | | | |
| 20 | | | | | | |
| 21 | #0000h | #F003h | #F001h | #F003h | #F001h | #F001h |
| 22 | #0000h | #F002h | #F001h | #F002h | #F001h | #F001h |
| 23 | | | | | | |
| 24 | #0000h | #F000h | #F001h | #F000h | #F001h | #F001h |
| 25 | #0000h | #F000h | #F000h | #F000h | #F000h | #F000h |
| 26 | | | | | | |
| 27 | | | | | | |
| 28 | | | | | | |
| 29 | | | | | | |
| 30 | #0000h | #F002h | #F002h | #F003h | #F003h | #F003h |
| 31 | | | | | | |
| 32 | | | | | | |
| 33 | | | | | | |
| 34 | | | | | | |
| 35 | | | | | | |
| 36 | #0000h | #F004h | #F005h | #F003h | #F003h | #F003h |
| 37 | | | | | | |
| 38 | | | | | | |
| 39 | | | | | | |
| 40 | | | | | | |
| 41 | | | | | | |
| 42 | #0000h | #F007h | #F005h | #F003h | #F003h | #F003h |
| 43 | | | | | | |
| 44 | | | | | | |
| 45 | | | | | | |
| 46 | #0000h | #0001h | #F005h | #F003h | #F003h | #F003h |
| 47 | #0000h | #0001h | #F004h | #F003h | #F003h | #F003h |
| 48 | | | | | | |
| 49 | #0000h | #0001h | #F002h | #F003h | #F003h | #F003h |
| 50 | #0000h | #0001h | #F002h | #F002h | #F002h | #F002h |
| 51 | | | | | | |
| 52 | | | | | | |
| 53 | | | | | | |

And this is the right part of the table:

| | Comment | wrkadr | tstadr | desta_cnt |
|---|---|---|---|---|
| 1 | | | | |
| 2 | | #FFFFh | #F000h | #0000h |
| 3 | | | | |
| 4 | | | | |
| 5 | | | | |
| 6 | | | | |
| 7 | Some SLC with Adr.LSB: = 0? → Here: Yes | #F000h | #F002h | |
| 8 | | | | |
| 9 | | | | |
| 10 | | | | |
| 11 | | | | |
| 12 | ST of SLC1 still low! | | | |
| 13 | Some SLC with Adr.LSB: = 0? → Here: Yes | #F002h | #F004h | |
| 14 | | | | |
| 15 | | | | |
| 16 | With only one SLC in low end portion the Schmitt-T stays high | | | |
| 17 | | | | |
| 18 | | | | |
| 19 | Some SLC with Adr.LSB: = 0? → Here: No | | | |
| 20 | Some SLC with Adr.LSB: = 1? → Here: Yes | | | |
| 21 | | | | #0001h |
| 22 | | | | |
| 23 | Rollback to shelved SLCs. Stop and assess, if wrkadr becomes <#F000h | #F000h | #F002h | |
| 24 | | | | |
| 25 | | | | |
| 26 | | | | |
| 27 | | | | |
| 28 | | | | |
| 29 | | | | |
| 30 | | | | |
| 31 | | | | |
| 32 | Some SLC with Adr.LSB: = 0? → Here: Yes | #F002h | #F004h | |
| 33 | | | | |
| 34 | | | | |
| 35 | | | | |
| 36 | | | | |
| 37 | | | | |
| 38 | Some SLC with Adr.LSB: = 0? → Here: Yes | #F004h | #F006h | |
| 39 | | | | |
| 40 | | | | |
| 41 | | | | |
| 42 | | | | |
| 43 | | | | |
| 44 | Some SLC with Adr.LSB: = 0? → Here: No | | | |
| 45 | Some SLC with Adr.LSB: = 1? → Here: Yes | | | |
| 46 | | | | #0002h |
| 47 | | | | |
| 48 | Rollback to shelved SLCs. Stop and assess, if wrkadr becomes <#F000h | #F002h | #F004h | |
| 49 | | | | |
| 50 | | | | |
| 51 | | | | |
| 52 | | | | |
| 53 | | | | |

The steps are repeated until all SLCs have their final address, i.e. in the example also SLC3 to SLC6. At the end of the procedure some steps may be performed to clear some variables etc.

Using the gist of the shown embodiment for the Schmitt trigger circuits and using the messages and tokens used in this embodiment it is possible for the person skilled in the art to realize also the first three methods for allocating addresses mentioned above without undue burden or effort.

Although embodiments of the present invention and their advantages have been described in detail above, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, process, manufacture, method or steps described in the present invention. As one of ordinary skill in the art will readily appreciate from the disclosure of the invention systems, processes, manufacture, methods or steps presently existing or to be developed later that perform substantially the same function or achieve substantially the same result as the corresponding embodiments described herein may be utilized according to the present invention. Accordingly, the appended claims are intended to include within their scope such systems, processes, methods or steps.

It is possible to combine the embodiments of the introduction with each other. Furthermore, it is possible to combine the examples of the description of Figures with each other. Further, it is possible to combine the embodiments of the introduction and the examples of the description of Figures.

The invention claimed is:

1. An optical output device, comprising:
   at least one bus system which comprises:
   at least two bus wires of a bus;
   a first bus unit and a second bus unit; and
   at least one bus control unit;
   wherein each of the first bus unit and the second bus unit comprises:
   at least one optical output element;
   at least one output control unit whose output is connected to the at least one optical output element;
   a first storage unit for storing address data of the corresponding bus unit;
   a counter unit;
   a second storage unit for storing a counter value changed by the counter unit, the first storage unit and the second storage unit are separately arranged within the each of the first bus unit and the second bus unit, respectively;
   a comparison unit whose inputs are separately connected to the first storage unit and to the second storage unit; and
   a control unit whose input is connected to an output of the comparison unit and which controls take-over of data from the bus into the at least one output control unit depending on an output signal or on output data of the comparison unit; and
   wherein the first bus unit and the second bus unit are connected in parallel to one of the at least two bus wires for data transmission.

2. The optical output device according to claim 1, wherein each of the first bus unit and the second bus unit comprises an 8b/10b decoding unit;
   and wherein each of the at least one bus control unit comprises a driver unit which sends data according to a differential signal transmitting method;
   and wherein each of the first bus unit and the second bus unit comprises a receiver unit, which receives data according to a differential signal transmitting method;
   and wherein the optical output device does not comprise separate address lines between the at least one bus control unit and the first bus unit and the second bus unit or an address bus that is multiplexed with a data bus.

3. The optical output device according to claim 1, wherein the at least one bus control unit operates according to a bus protocol according to which data for bus units with consecutive addresses may be sent or is sent in ascending or descending order without transmission of intermediate address data.

4. The optical output device according to claim 1, wherein the optical output device comprises a serial connection of at least two electronic components;
   wherein at least one input of each of the first bus unit and the second bus unit is connected to a respective electrically conductive connection between two electronic components of the serial connection;
   and wherein the at least one input of each first bus unit and the second bus unit is connected to an input of a determining unit, to an input of an analog to digital converter unit, or to an input of a Schmitt Trigger unit;
   and wherein the first storage unit is a volatile storing unit;
   and wherein at least one end or both ends of the serial connection are connected to the at least one bus control unit or to a second control unit.

5. The optical output device according to claim 1, wherein the first storage unit is a non-volatile storing unit.

6. The optical output device according to claim 1, wherein the at least two bus wires extend along a straight line;
   or wherein the at least two bus wires extend along a path that changes direction at least once;
   whereby adjacent ones of the first bus unit and the second bus unit and adjacent ones of the at least one optical output element are arranged according to a constant grid pattern.

7. The optical output device according to claim 1, wherein the at least two bus wires extend within a plane and change direction at least once within the plane;
   whereby between parts of the bus that change direction there are sections of the first bus unit and the second bus unit in which the at least two bus wires extend along a straight line;
   whereby adjacent ones of the first bus unit and the second bus unit and adjacent ones of the at least one optical output element are arranged according to a constant grid pattern; or
   whereby there are no sections of the first bus unit and the second bus unit in which the at least two bus wires extend along a straight line between the parts of the bus that change direction.

8. The optical output device according to claim 1, wherein the at least two bus wires extend within several planes that are arranged in parallel with regard to each other;
   wherein the at least two bus wires change direction at least once within each of the several planes;
   whereby between parts of the bus that change direction there are sections of the first bus unit and the second bus unit in which the at least two bus wires extend along a straight line;
   whereby adjacent ones of the first bus unit and the second bus unit and adjacent ones of the at least one optical output element are arranged according to a constant grid pattern.

9. The optical output device according to claim 1, wherein the optical output device comprises at least two bus systems that each comprise least two bus wires, bus units and bus control units,
   and wherein a super ordinated control unit controls the bus control units;
   wherein the at least two bus systems extend in parallel to each other; and
   wherein the at least two bus systems are arranged in one plane or are arranged in several planes that are parallel with regard to each other.

10. The optical output device according to claim 1, wherein the at least one optical output element comprises inorganic light emitting diodes or organic light emitting diodes or halogen lamps or light bulbs,
    whereby each of the first bus unit and the second bus unit comprises three optical output elements having output wavelength that are different with regard to each other.

11. The optical output device according to claim 1, wherein the first bus unit and the second bus unit are connected to at least one input element, or to a sensor element.

12. The optical output device according to claim 1, wherein the optical output device comprises a carrier device that carries the bus wires and the bus units,
    wherein the carrier device comprises a material that is transparent for optical radiation of the output elements, or wherein the optical output elements or the bus units are mounted on the bus wires without using an additional carrier device.

13. A method for assembling an optical output device, comprising:

using at least two bus wires of a bus, connecting a first bus unit and a second bus unit in parallel connection to the at least two bus wires, connecting at least one bus control unit that sends data to the first bus unit and the second bus unit in order to control optical output elements that are electrically connected to the first bus unit and the second bus unit to the at least two bus wires, wherein each of the first bus unit and the second bus unit comprises:

at least one optical output element;

at least one output control unit whose output is connected to the least at one optical output element;

a first storage unit for storing address data of the first bus unit;

a counter unit;

a second storage unit for storing a counter value changed by the counter unit, the first storage unit and the second storage unit are separately arranged within the each of the first bus unit and the second bus unit, respectively;

a comparison unit whose inputs are separately connected to the first storage unit and to the second storage unit;

and a control unit whose input is connected to an output of the comparison unit; and which controls takeover of data from the bus into the control unit depending on an output signal or on output data of the comparison unit.

14. The optical output device according to claim 11, wherein the at least one input element is selected from the group consisting of a switch and a push-button, and the sensor element is selected from the group consisting of a photo diode, a photo transistor, a photo resistor, and a temperature sensor.

* * * * *

UNITED STATES PATENT AND TRADEMARK OFFICE
CERTIFICATE OF CORRECTION

| | | |
|---|---|---|
| PATENT NO. | : 11,928,069 B2 | Page 1 of 1 |
| APPLICATION NO. | : 17/422666 | |
| DATED | : March 12, 2024 | |
| INVENTOR(S) | : Christoph Heldeis | |

It is certified that error appears in the above-identified patent and that said Letters Patent is hereby corrected as shown below:

In the Claims

Column 29, Claim 13, Line 18, delete "least at" and replace with --at least--

Signed and Sealed this
Sixteenth Day of April, 2024

*Katherine Kelly Vidal*

Katherine Kelly Vidal
*Director of the United States Patent and Trademark Office*